Oct. 11, 1966 B. SHERSTIUK 3,278,693
SENDER APPARATUS AND SUPERVISORY APPARATUS IN A UNIT CONNECTING
REGISTERS AND SENDERS TO THE SWITCHING NETWORK
Filed Aug. 27, 1963 28 Sheets-Sheet 1

INVENTOR.
BORIS SHERSTIUK
BY
C. A. Gulbrandsen
ATTY.

Oct. 11, 1966 B. SHERSTIUK 3,278,693

SENDER APPARATUS AND SUPERVISORY APPARATUS IN A UNIT CONNECTING REGISTERS AND SENDERS TO THE SWITCHING NETWORK

Filed Aug. 27, 1963 28 Sheets-Sheet 5

Oct. 11, 1966 B. SHERSTIUK 3,278,693

SENDER APPARATUS AND SUPERVISORY APPARATUS IN A UNIT CONNECTING REGISTERS AND SENDERS TO THE SWITCHING NETWORK

Filed Aug. 27, 1963 28 Sheets-Sheet 6

Oct. 11, 1966 B. SHERSTIUK 3,278,693

SENDER APPARATUS AND SUPERVISORY APPARATUS IN A UNIT CONNECTING REGISTERS AND SENDERS TO THE SWITCHING NETWORK

Filed Aug. 27, 1963 28 Sheets-Sheet 8

Oct. 11, 1966 B. SHERSTIUK 3,278,693

SENDER APPARATUS AND SUPERVISORY APPARATUS IN A UNIT CONNECTING REGISTERS AND SENDERS TO THE SWITCHING NETWORK

Filed Aug. 27, 1963 28 Sheets-Sheet 11

Oct. 11, 1966 B. SHERSTIUK 3,278,693

SENDER APPARATUS AND SUPERVISORY APPARATUS IN A UNIT CONNECTING REGISTERS AND SENDERS TO THE SWITCHING NETWORK

Filed Aug. 27, 1963 28 Sheets-Sheet 23

3,278,693
Patented Oct. 11, 1966

3,278,693

SENDER APPARATUS AND SUPERVISORY APPARATUS IN A UNIT CONNECTING REGISTERS AND SENDERS TO THE SWITCHING NETWORK

Boris Sherstiuk, Chicago, Ill., assignor to Automatic Electric Laboratories, Inc., Northlake, Ill., a corporation of Delaware Filed Aug. 27, 1963, Ser. No. 304,827
24 Claims. (Cl. 179—18)

Figures 1, 2:
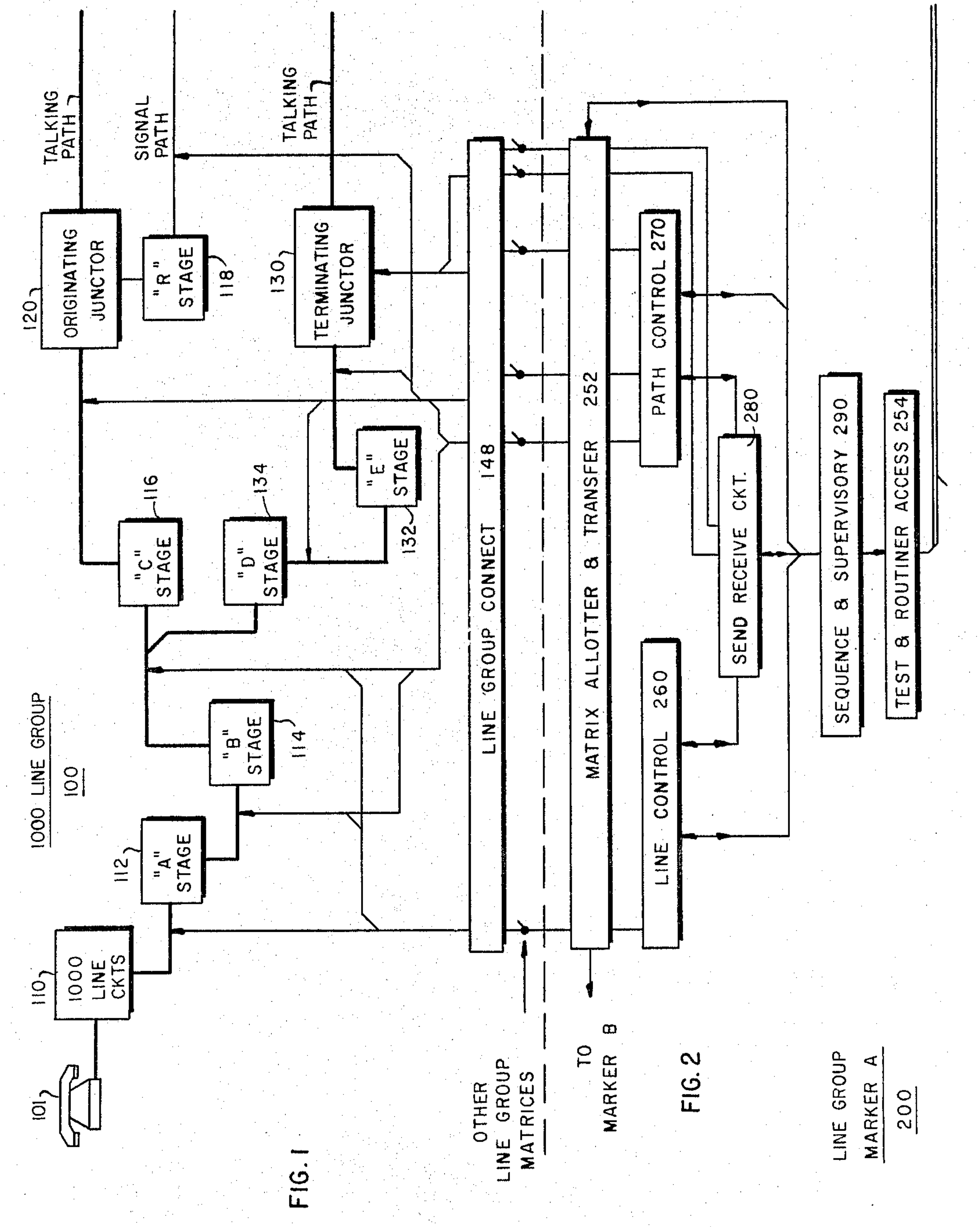
Figures 3, 4:
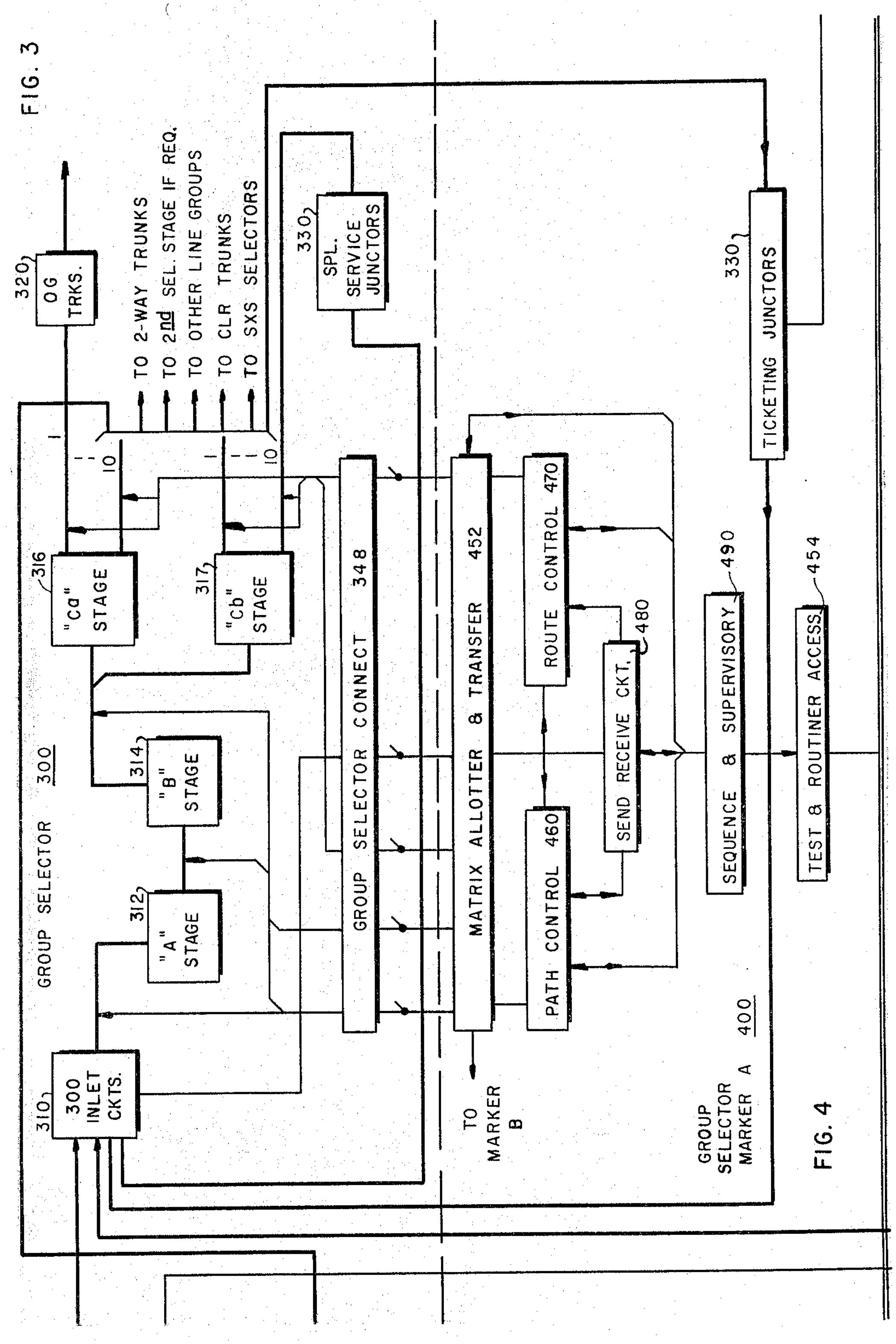
Figure 5:
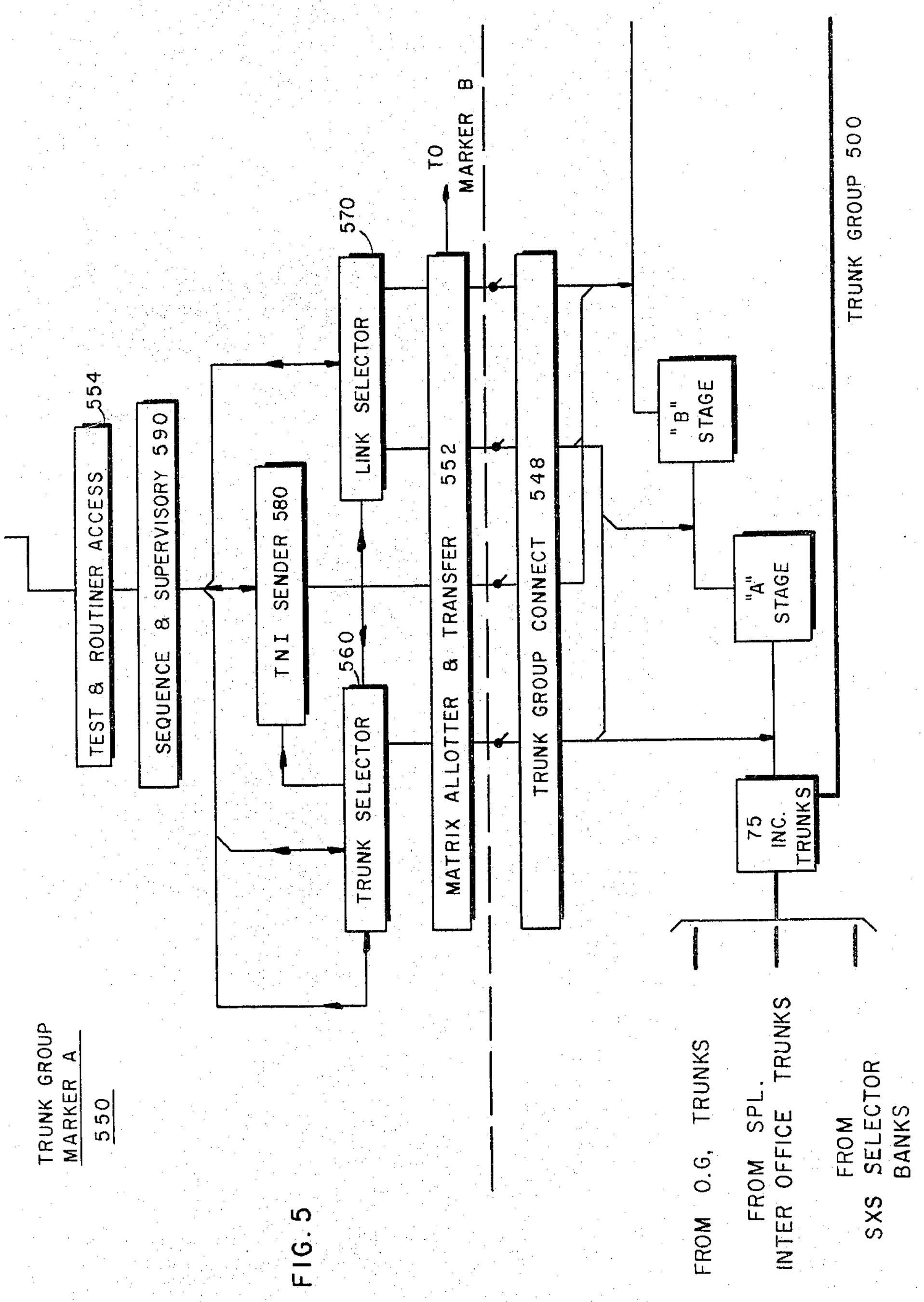
Figure 6:
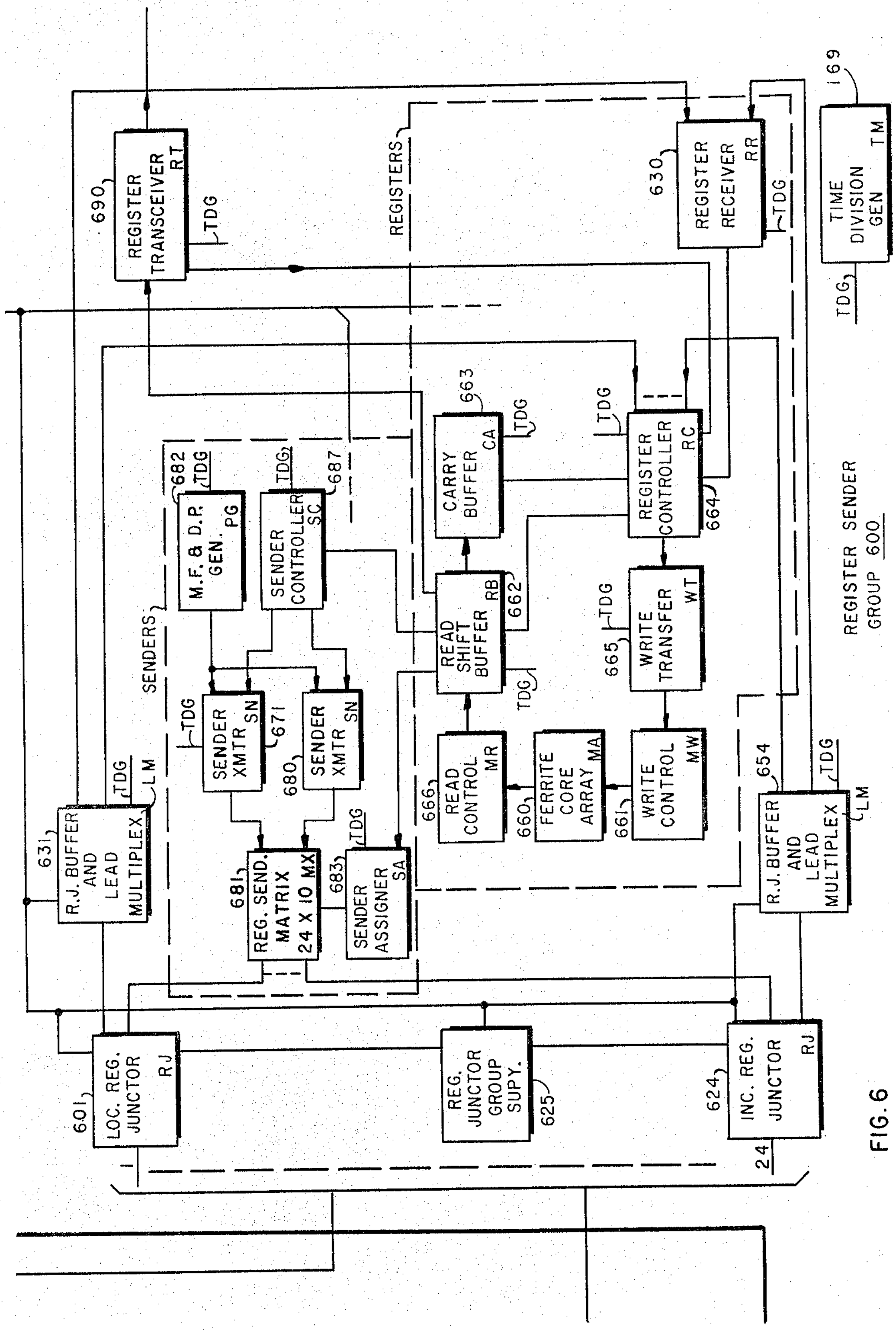
Figure 7:
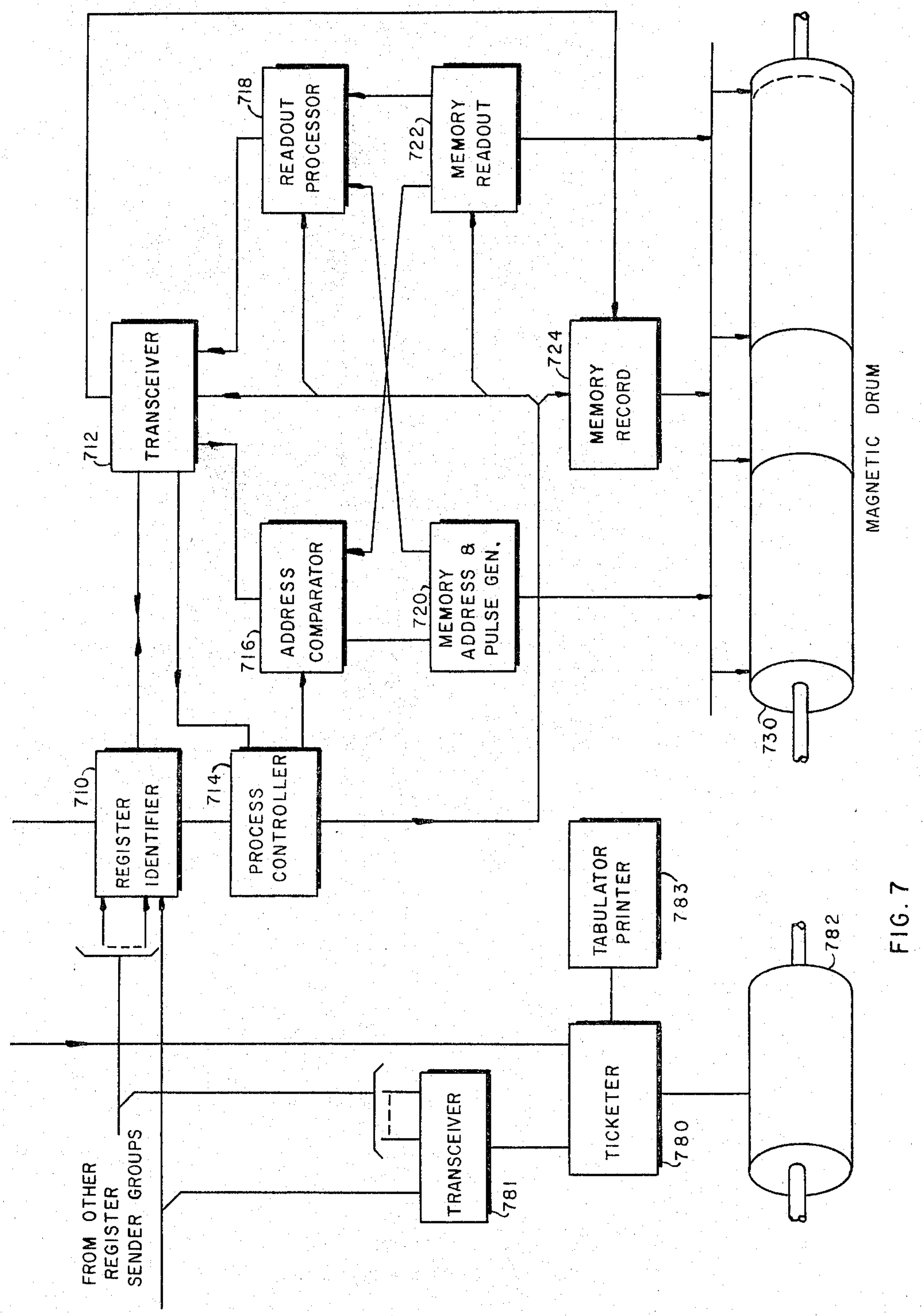
Figure 8:
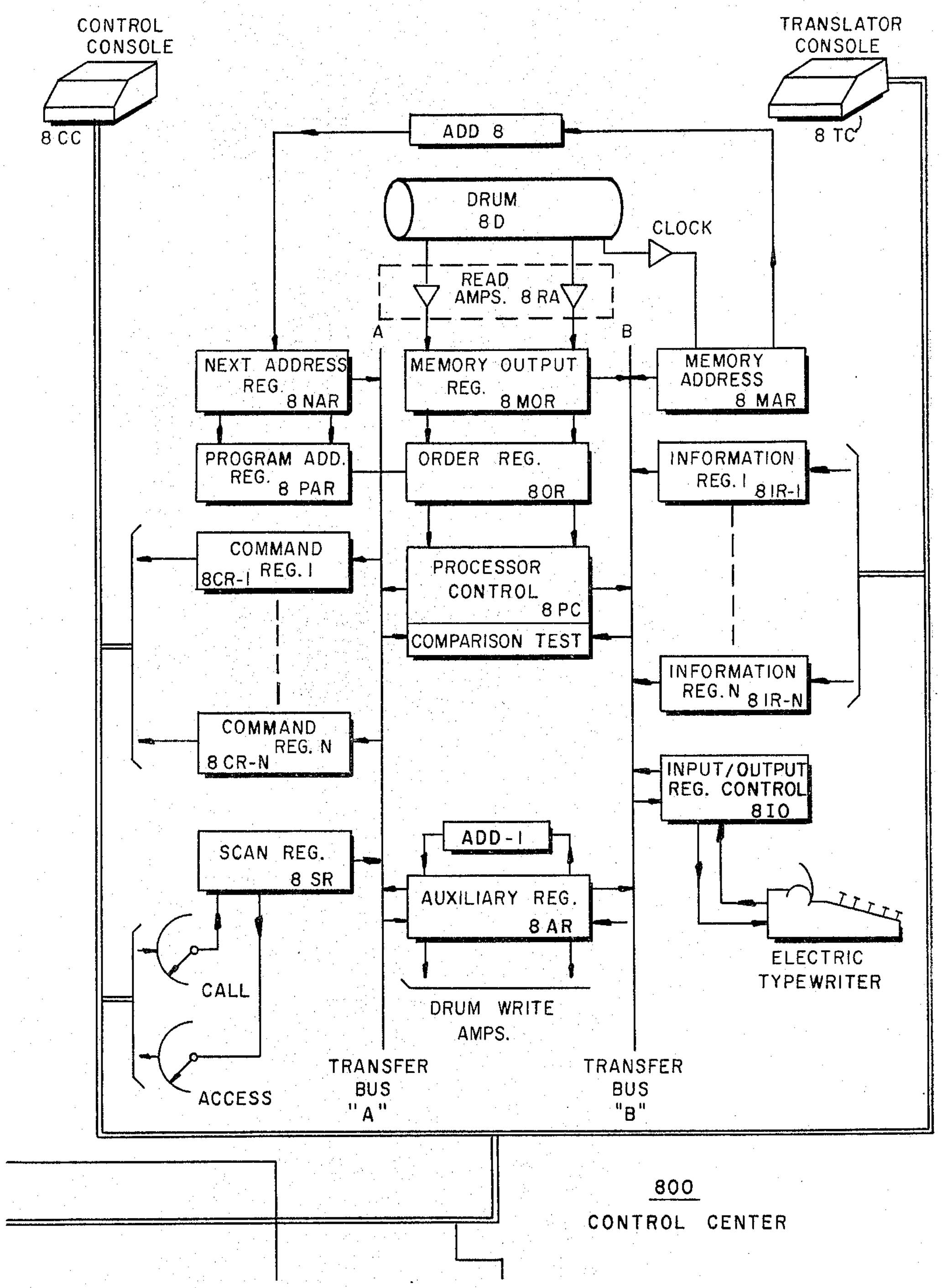

This invention relates to sender apparatus and to supervisory apparatus in a unit connecting registers and senders to the switching network for a communication switching system, and more particularly to a code pulse signaling system with control circuits for use in a register-translator communication switching system having marker controlled switching stages.

A communication switching system is disclosed in U.S. patent application Serial No. 230,887, filed October 16, 1962, by Kore K. Spellnes, now Patent No. 3,170,041. Register apparatus for this system is disclosed in patent application Serial No. 231,625 filed October 19, 1962, by K. E. Prescher, R. E. Schauer and J. J. Van Bosse, now Patent No. 3,173,994. The sender apparatus is disclosed in my copending application Serial No. 280,053, filed May 13, 1963. The system as disclosed in these applications comprises line group switching stages and markers, group selector stages and markers, a register-sender group, and a translator. There is also an incoming trunk group which provides access with incoming trunks to the registers, and a control center which contains a special computer for operation analysis and recording. The line group switching stage includes a plurality of originating junctors and a plurality of terminating junctors. Originating call requests are identified by the marker which causes a connection to be established from the calling line through the end of the tandem switching stages to the originating junctor, and from there to a register junctor and also a selector inlet. Calling line identity is transmitted from the line group marker, through the register junctor into a receiver for storage by the register. The register apparatus is arranged on a time division multiplex basis with a recirculating memory. Call signals designating the called party directory number are transmitted from the calling line through the originating junctor to the register junctor, from there are handled on a time division multiplex basis for storage in a register memory. The called party directory number is supplied from the register to the transmitter which returns the called party equipment location number to the register. A sender is then called into operation and supplied a seizure signal which through the register junctor and the originating junctor to the selector inlet calls in the selector marker, which then connects a send-receive circuit to the principal communication conductors of this path from the sender. Part of the called party number is transmitted from the sender to the selector, and used to cause a connection to be established through tandem stages in the selector to an output to either a terminating junctor of a line group for a local call, or to an outgoing trunk circuit for a call to a distant office. If this is a local terminating call the terminating junctor is seized which causes a send-receive circuit in the line group marker to be connected to the principal communication conductors of the path which has been extended up to this point, and the remaining digits of the called number are transmitted thereto. The line group marker then completes the connection from the terminating junctor to the called line. If it is an outgoing call the remaining switching digits are outpulsed by the mode required by the distant office.

The principal object of this invention is to provide sender apparatus which may be used for high-speed coded two-way communication with the local markers, with an efficient and reliable arrangement for receiving the called number information from the time division register apparatus in transmitting the information as required.

One feature of the invention relates to a code pulse transmitter and a receiver that are constructed for two-way communication. Two electronic counters, one in the code pulse transmitter and one in the receiver, are advanced in synchronism by a train of pulses. Reference pulses are transmitted over one conductor and corresponding pulses are transmitted over another conductor to convey binary-coded information from the transmitter to the receiver. The receiver transmits a stop signal to the transmitter to prevent the counters from advancing after the information signals have been transferred to the receiver, thereby providing revertive pulsing to transfer information from the markers to the transmitter. The stop signal prevents the counters from advancing at a particular count selected by the receiver and thereby registers information with the counter in the code pulse transmitter.

Another feature of the invention is embodied in apparatus used in processing information which may be received from the markers. This information includes a signal indicating that the marker send-receive circuit is connected and ready, signals such as trunk busy, line busy, line idle, resend, and a clear signal after the marker has received all of the needed information and found the required path. Three conductors are used to convey the information from the high-speed binary code transmitter to the send-receive circuits with two of these conductors being the tip and ring conductors which in a completed connection will be used for talking or other communication. A two-conductor option is provided which eliminates the necessity for a third control wire.

Another feature relates to the control circuits for the proper operation of the code pulse transmitter. A resend arrangement is provided wherein a resend signal may be received from the markers via the binary code pulse transmission, or may be generated in the sender, the signals from the marker being in response to conditions such as link blockage, and the signals from either the markers or locally generated in the sender being in response to various conditions of improper operation such as lack of parity due to noise in transmission. In response to the first such resend signal the terminating path so far established is released and an instruction is sent to the register to start the sending of the called number from the beginning. According to the invention a pair of reed relays are used to control the supply of the call signal to the terminating switching stages and to control the resend operation One of these relays is a particular reed-type relay which includes differential windings as disclosed in my copending U.S. patent application for a Control Circuit, Serial No. 204,936, filed June 25, 1962, now Patent No. 3,210,615. The other relay uses two windings one of which is shorted to provide slow release operation. The differential relay is operated upon initial seizure to transmit the call signal to the terminating switching stages, and the slow release relay is also operated under the control of the differential relay releases and after a predetermined time the slow release relay releases which causes the differential relay to reoperate and thereby again supply the call signal to the terminating switch stages. At this time the slow release relay remains unoperated and supplies a signal to be interpreted as a reorder signal. This and other reorder signal conditions cause the terminating switch train to be released and a fast busy tone to be supplied to the calling line.

Other features of this invention relate to the use of another differential type reed relay for recognition of several types of busy conditions including the reorder condition; the end of send condition; party identification; coin deposit test; and other features. These features will become more apparent with a further understanding of the invention.

Figure 9:
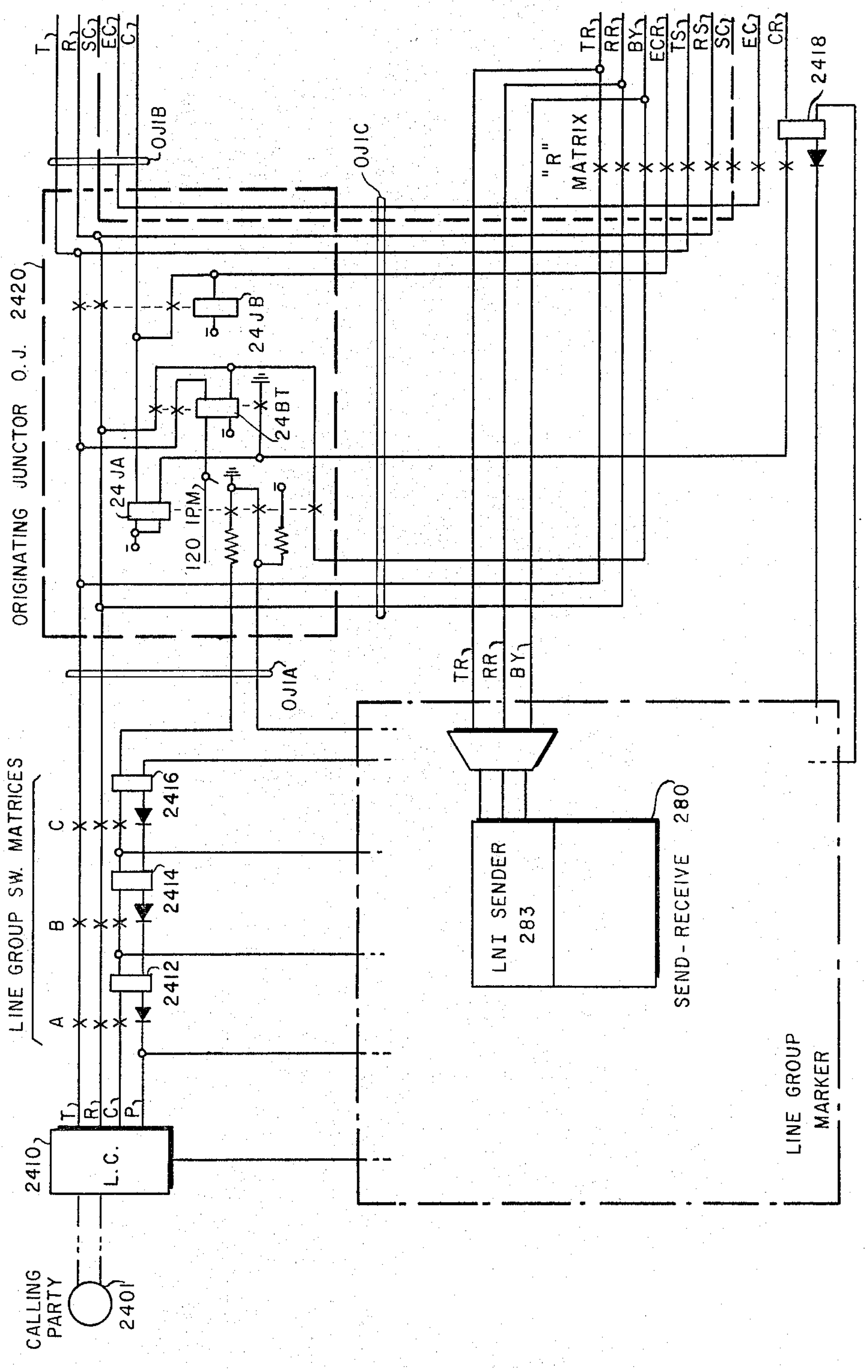
Figure 10:
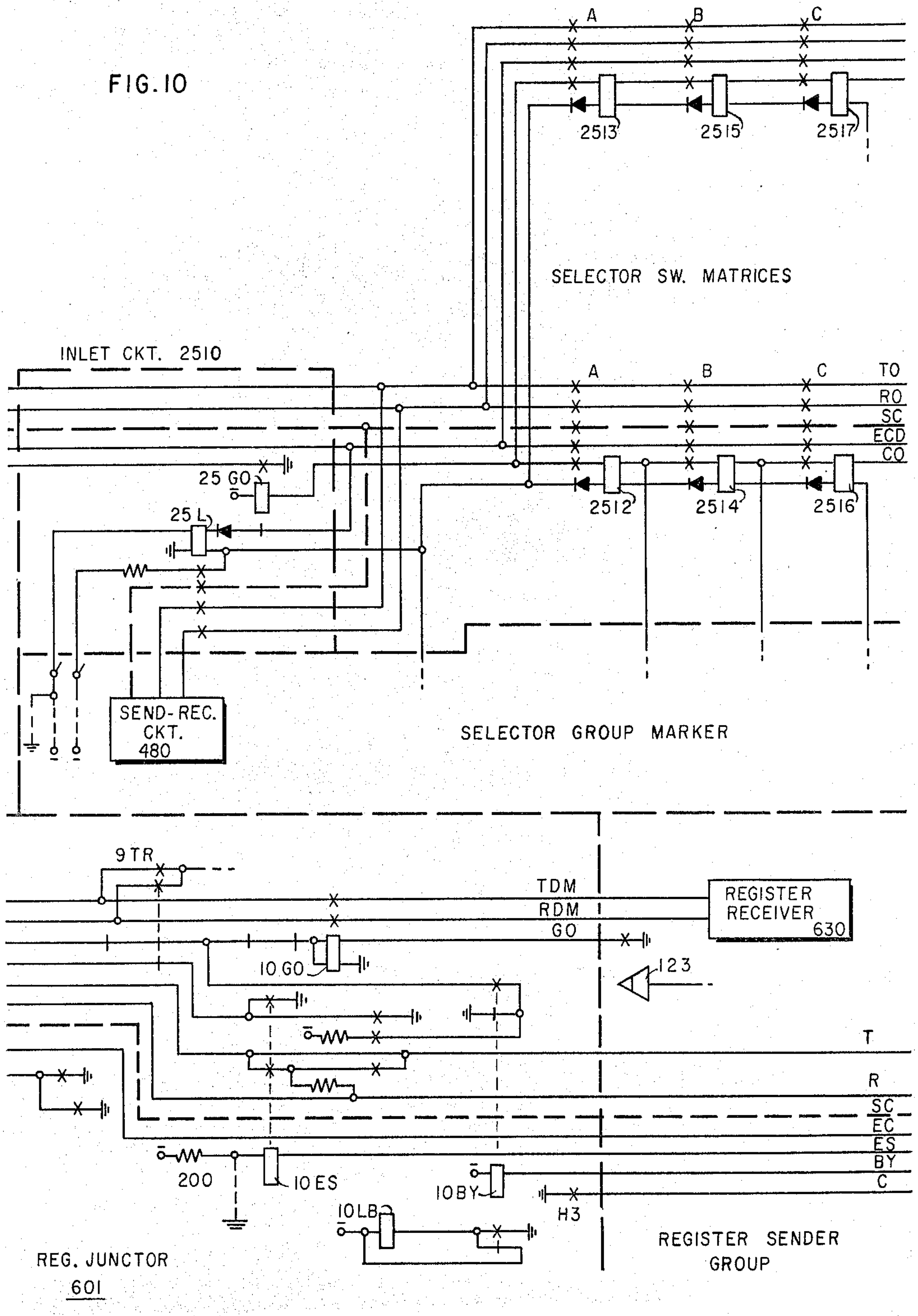
Figure 11:
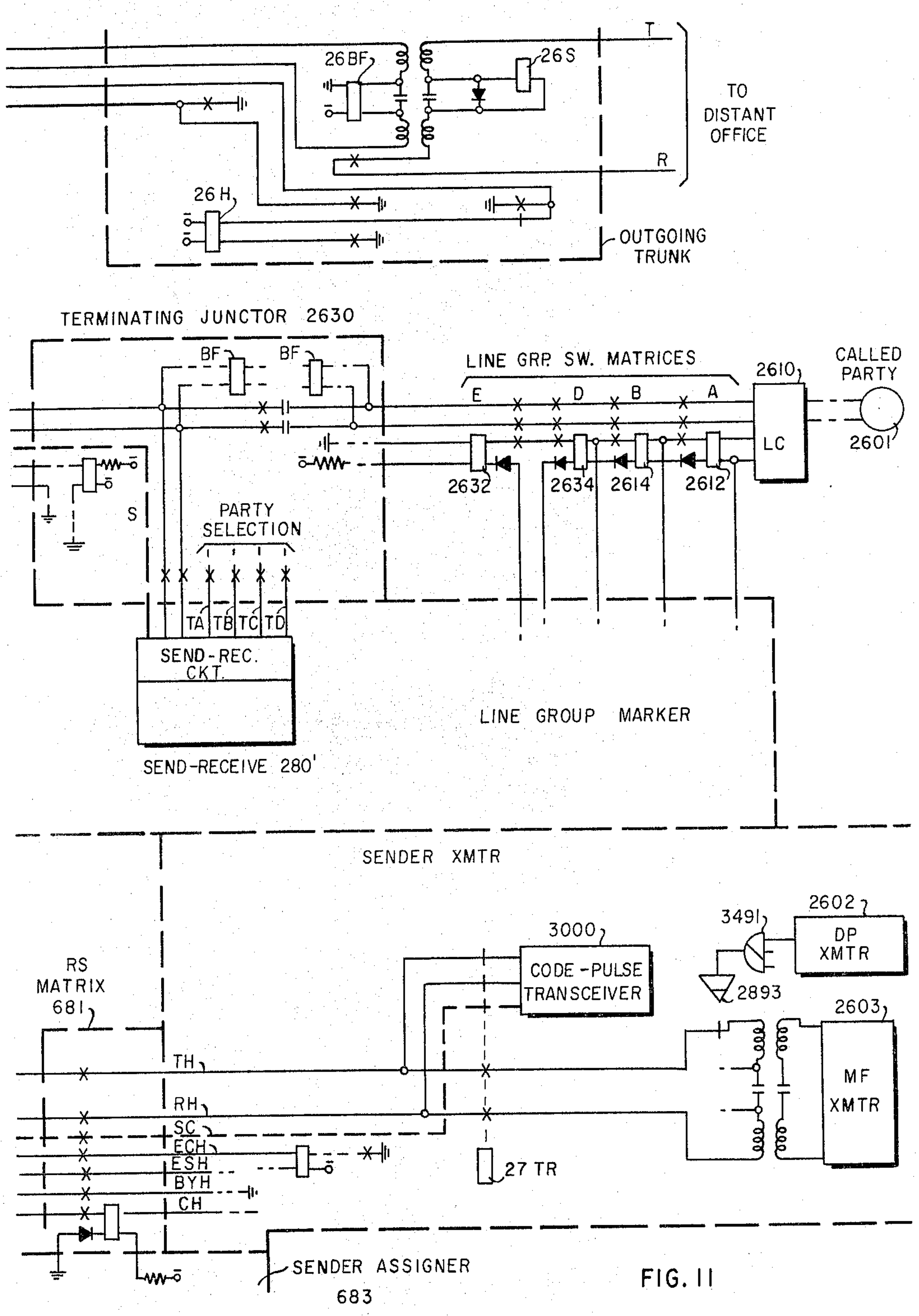
Figure 12:
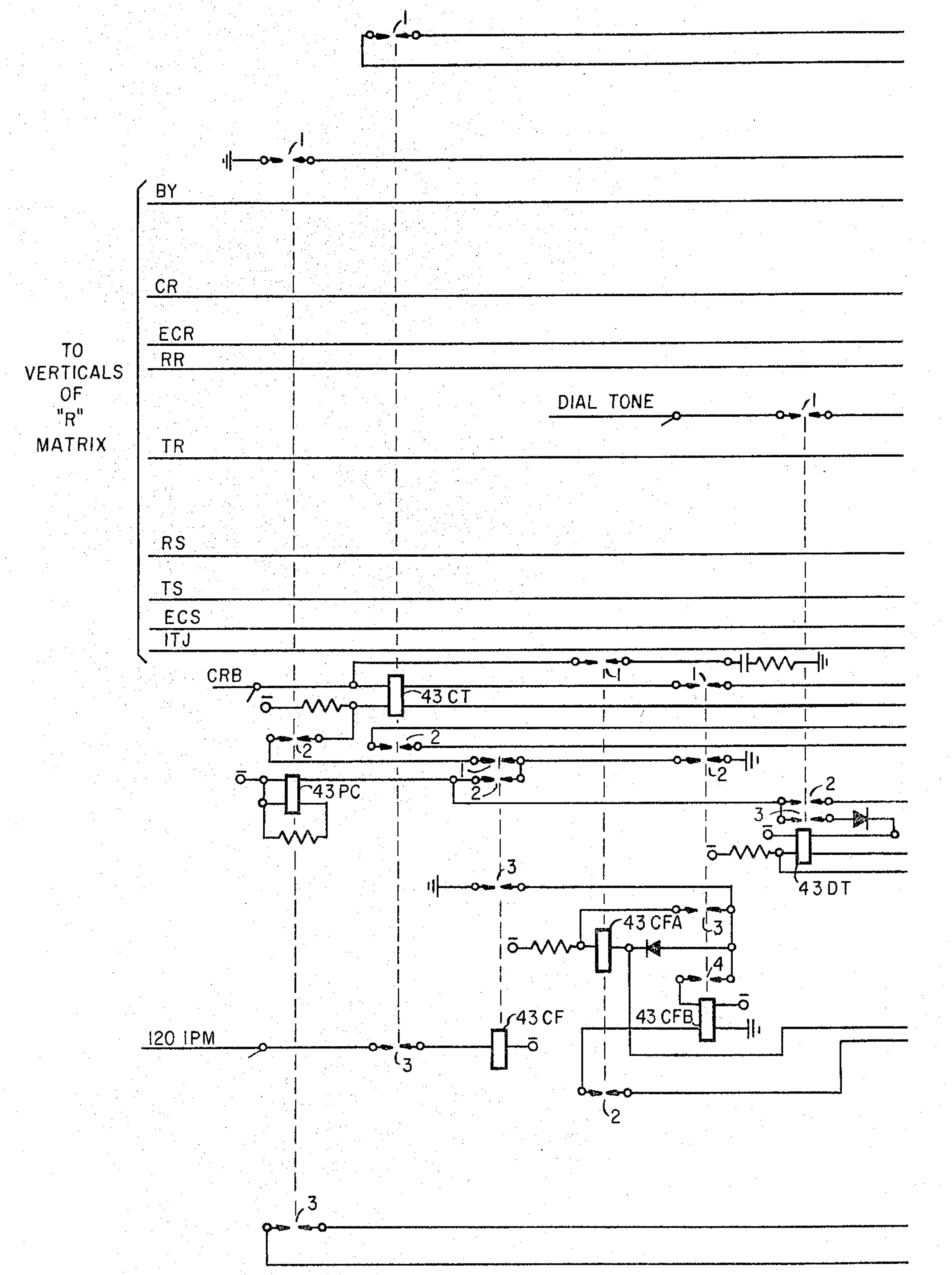
Figure 13:
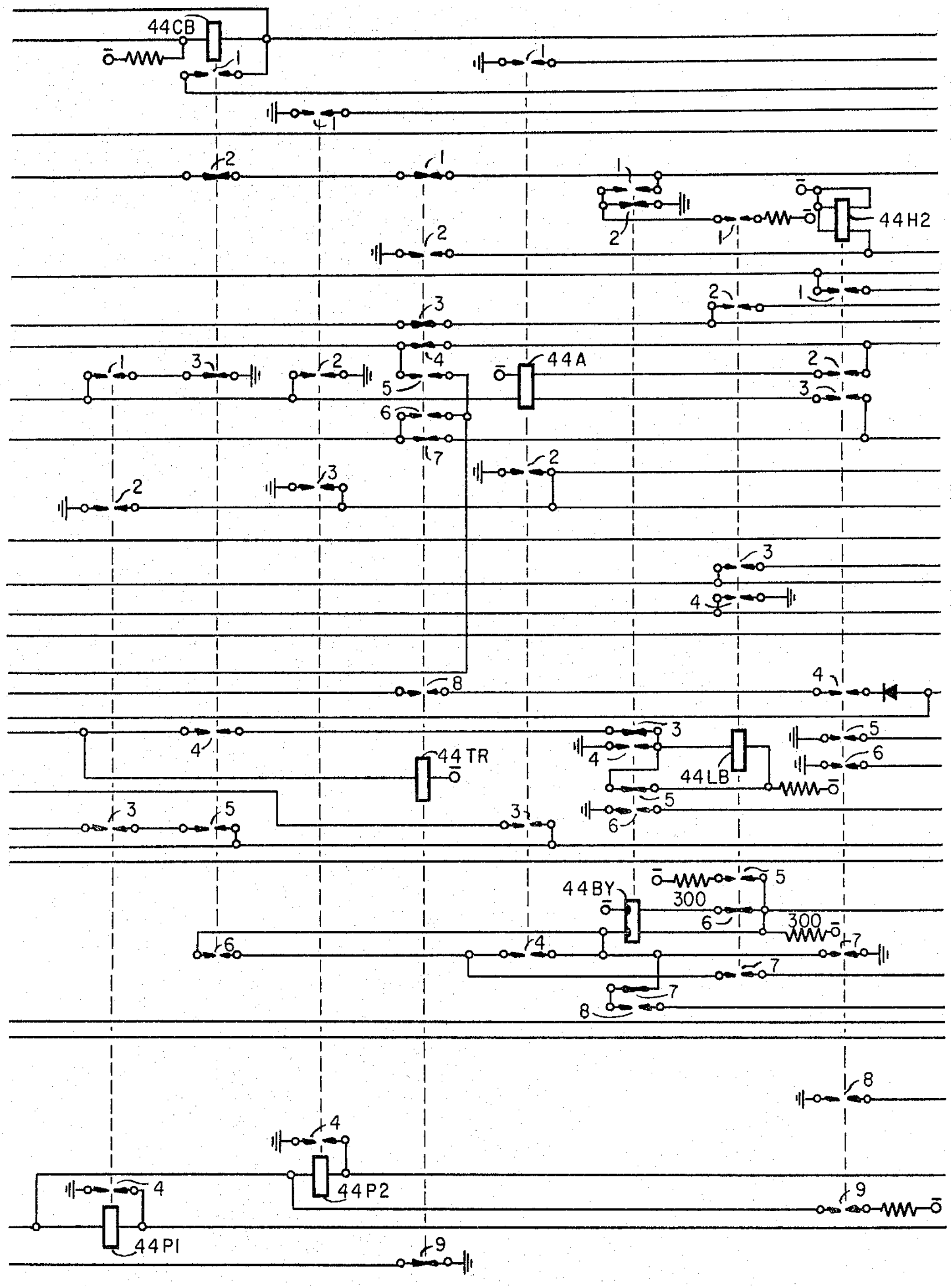
Figure 14:
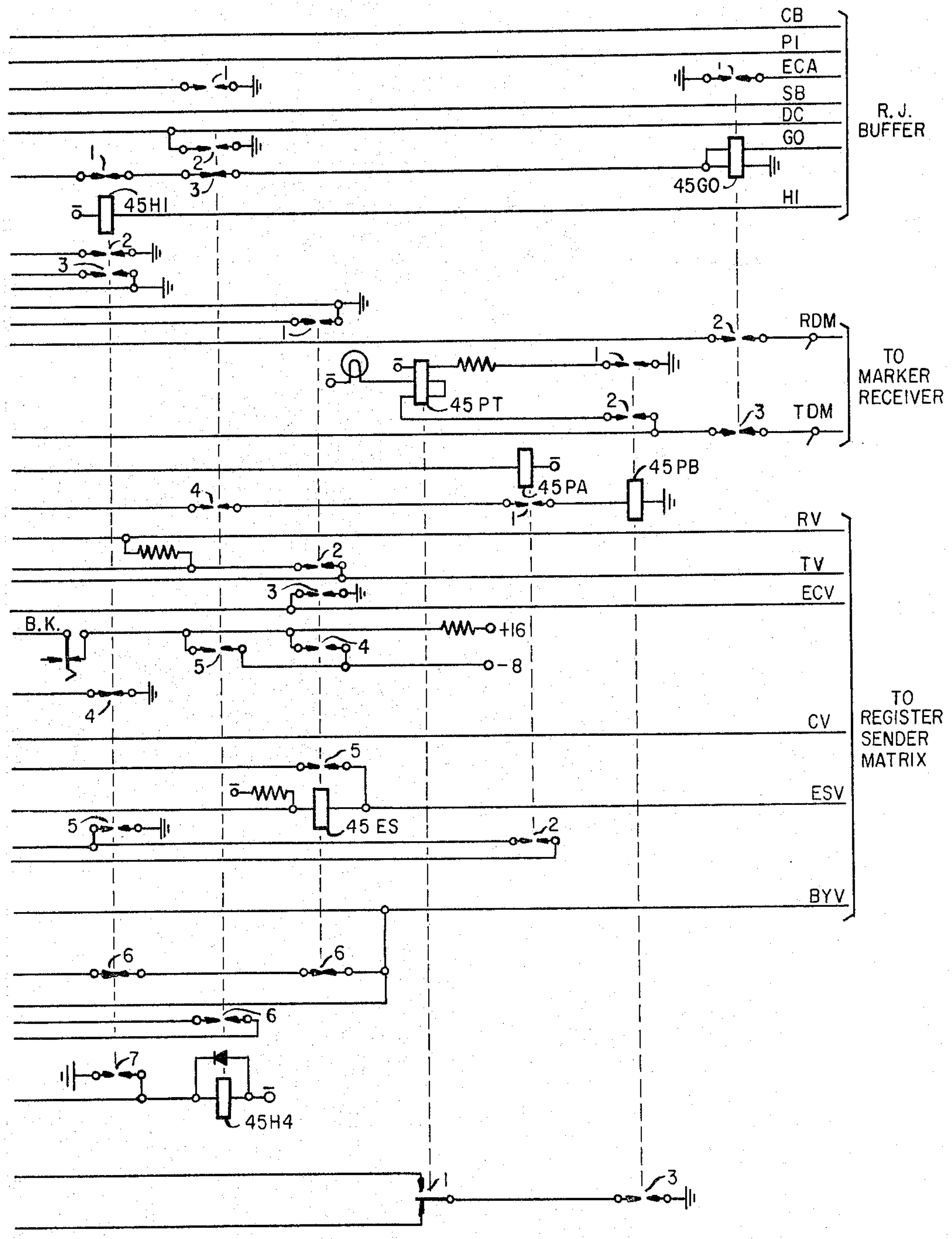
Figure 26:
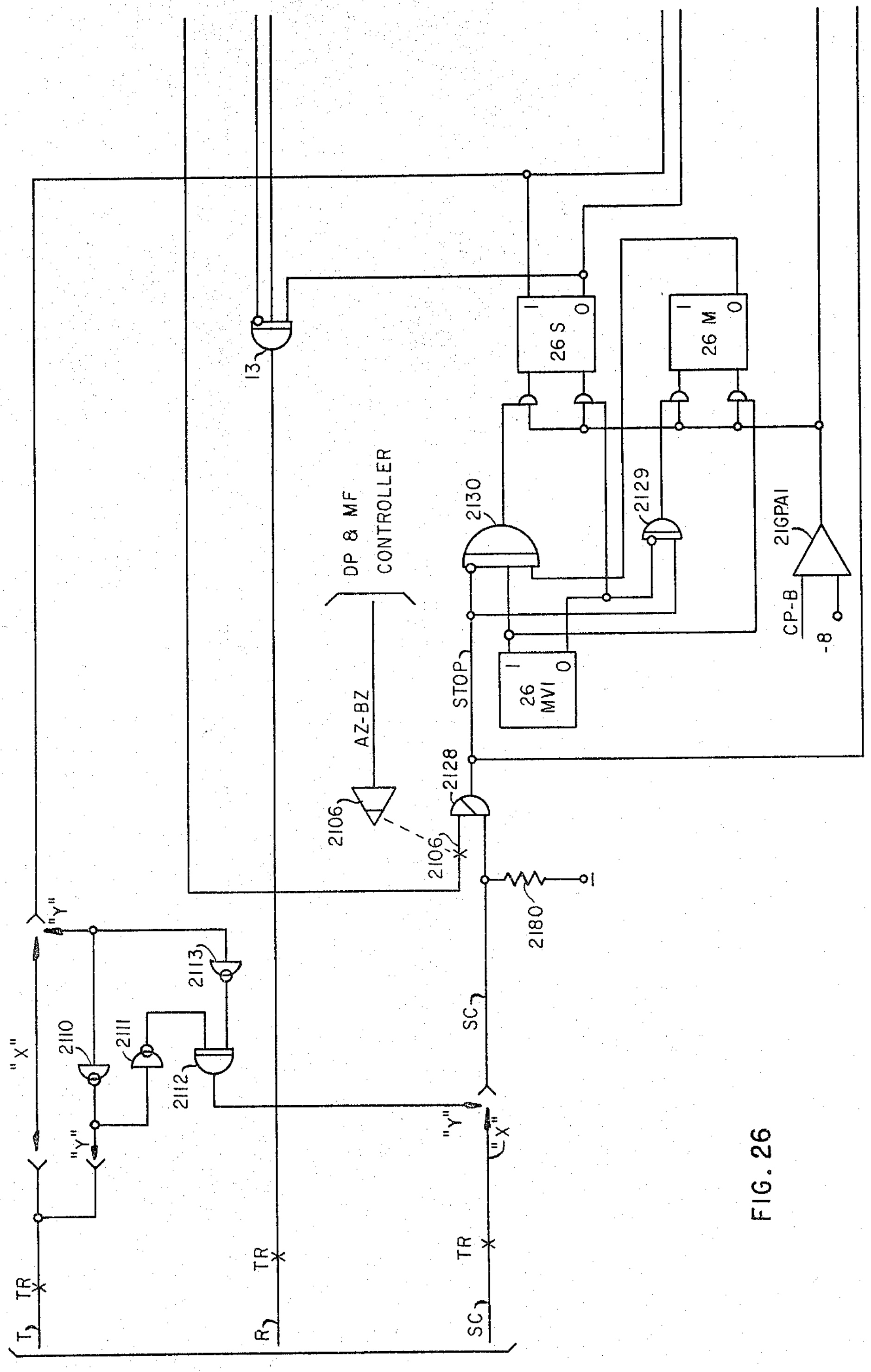
Figure 27:
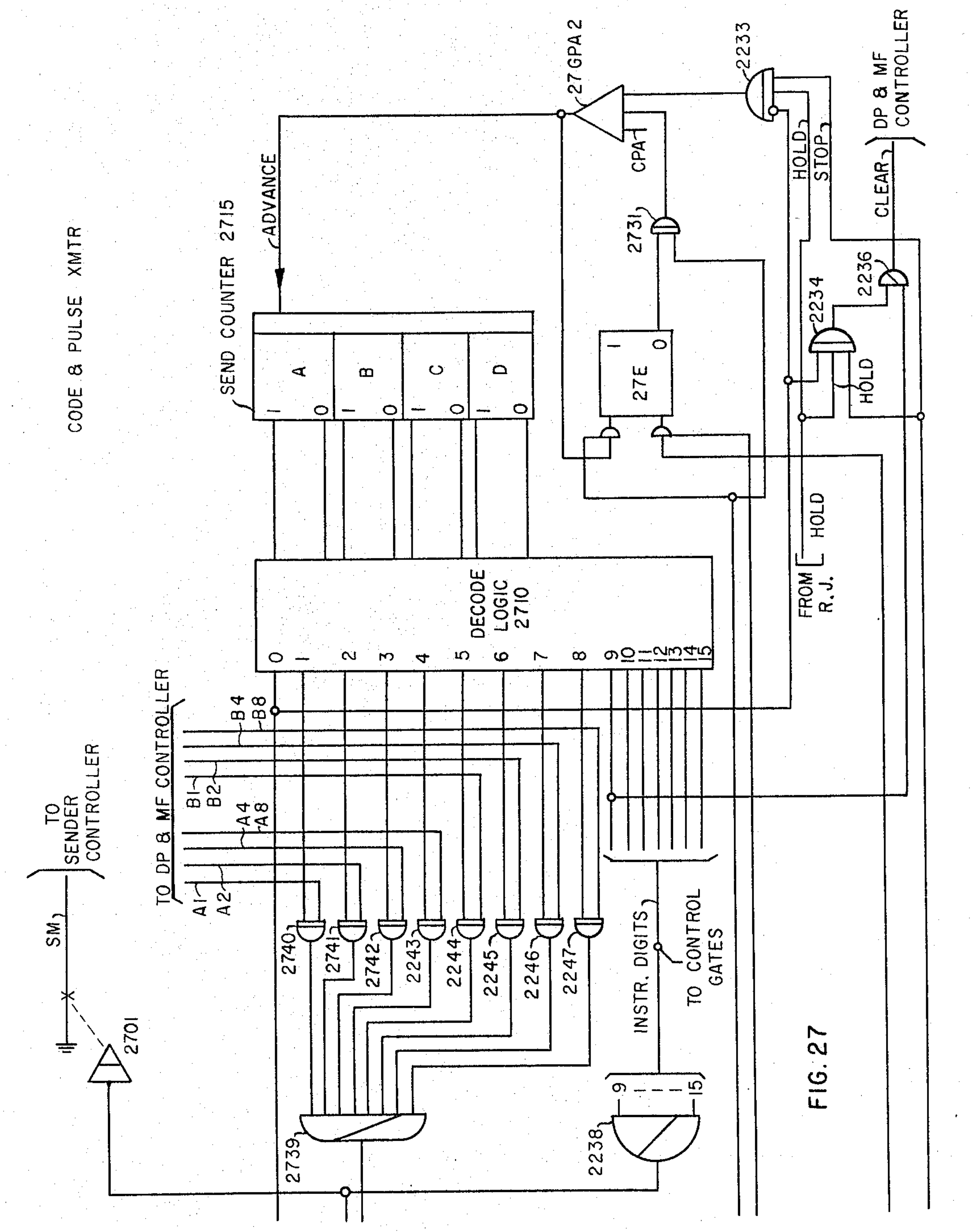
Figure 28:
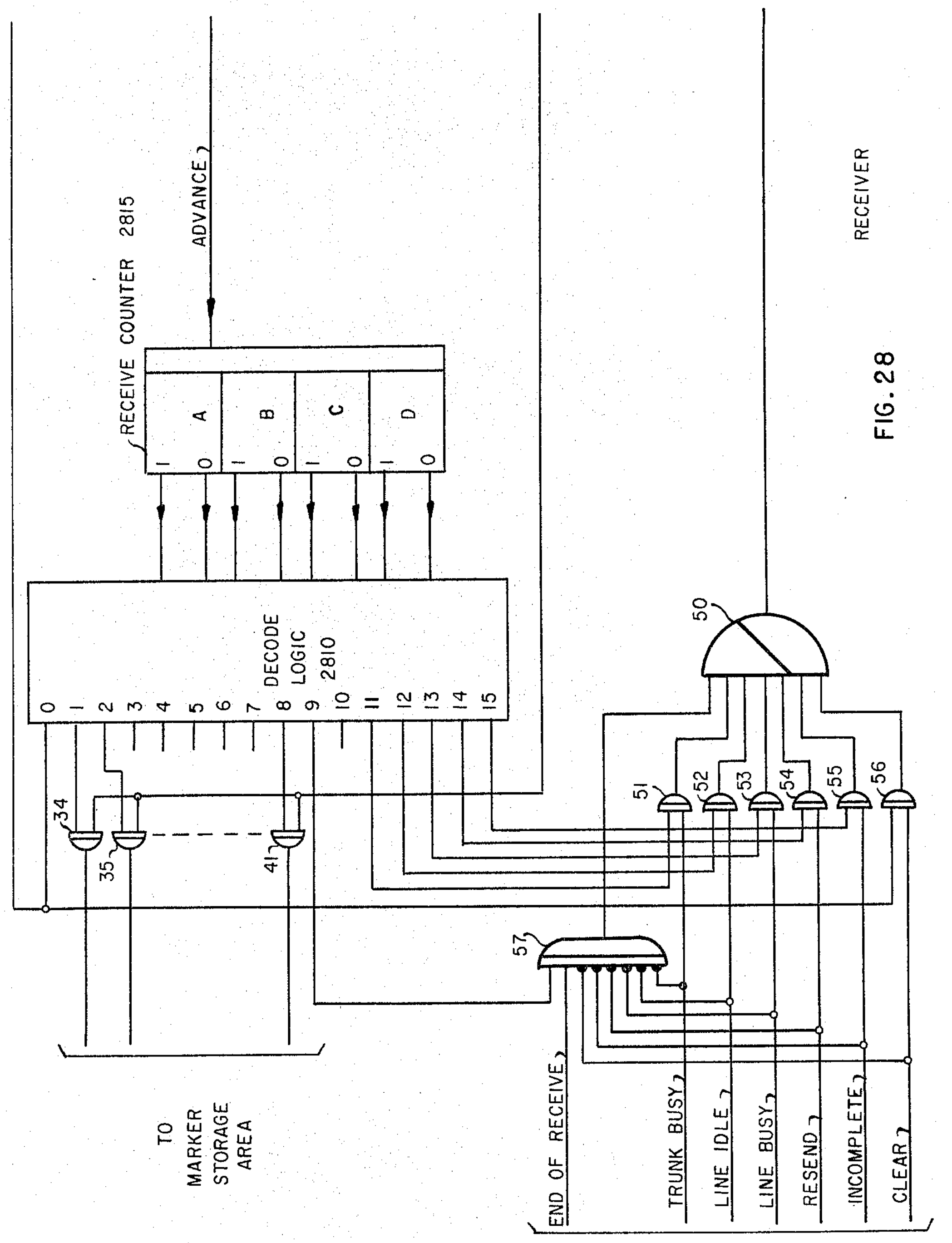
Figure 29:
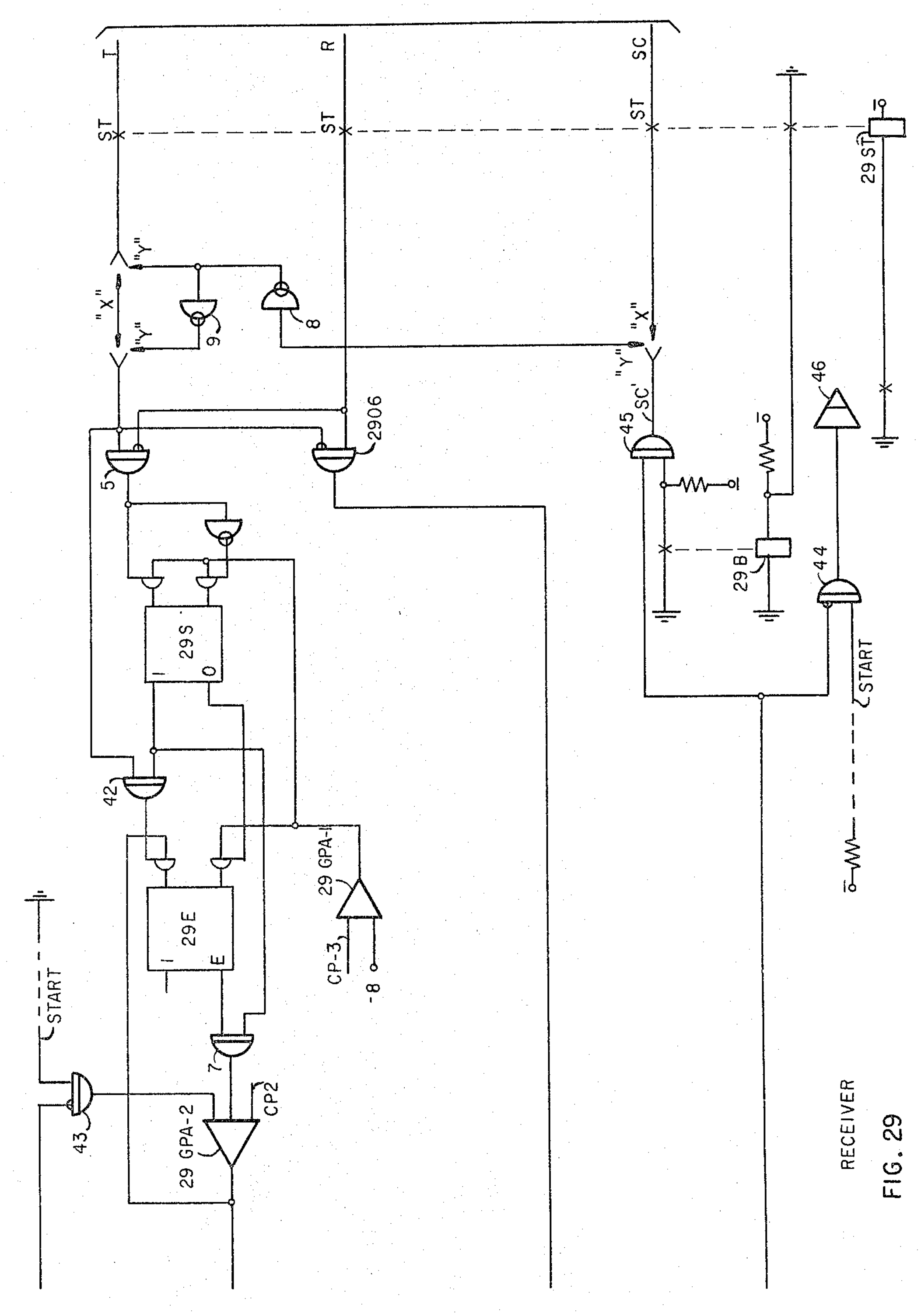
Figure 31:
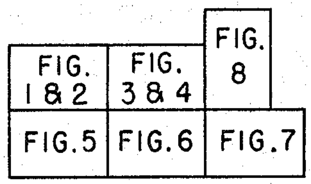
Figure 32:
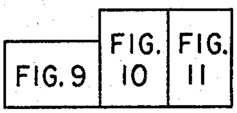
Figure 34:
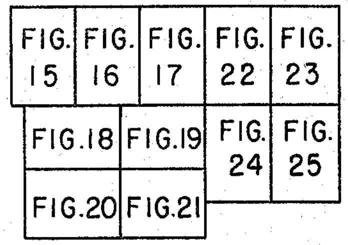
Figure 36:
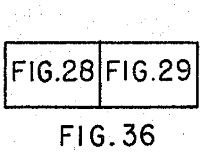
Figure 35:
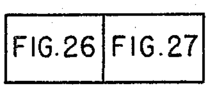
Figure 33:
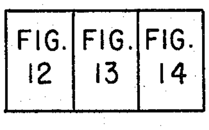

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–36, wherein:

FIGS. 1–8 when arranged as shown in FIG. 31 comprise a block diagram of a telephone switching exchange;

FIGS. 9–11 when arranged as shown in FIG. 32 comprise a call-thru diagram;

FIGS. 12–14 when arranged as shown in FIG. 33 comprise a schematic representation of a local register junctor;

FIGS. 15–25 when arranged as shown in FIG. 34 comprise a functional block diagram of one sender transmitter;

FIGS. 26 and 27 when arranged as shown in FIG. 35 comprise a functional block diagram of an alternative embodiment of a code pulse transmitter;

FIGS. 28 and 29 when arranged as shown in FIG. 36 comprise a functional block diagram of a receive circuit for the code pulse transmitter alternative embodiment.

Figure 30:
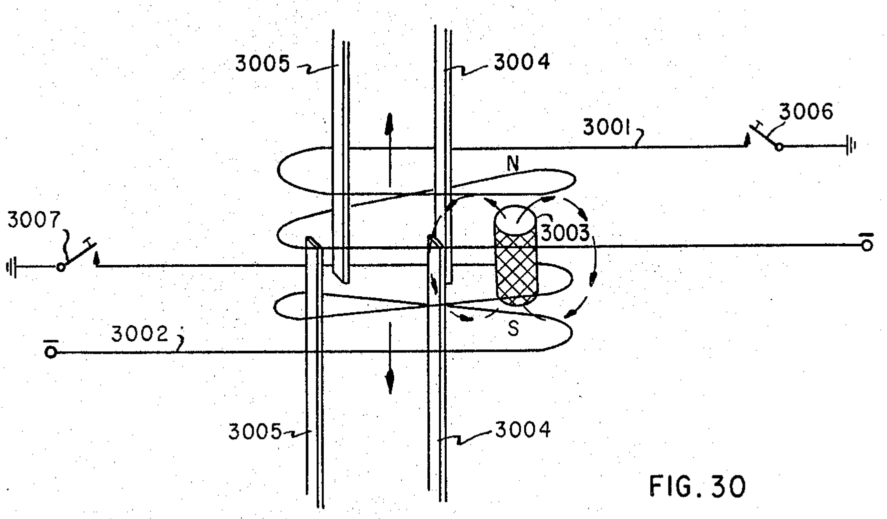

FIG. 30 is a symbolic representation of a differential reed relay.

The system is explained according to the following outline:

1. System Organization.
2. Sender Transmitter, Receive Circuits, and Register Junctor.
   - (A) Call-thru diagram.
   - (B) Register junctor.
   - (C) Loop and switchtrain supervisory unit.
   - (*D*) Diphase sending controller.
   - (E) Multifrequency and dial pulse controller.
   - (F) Code pulse transceiver alternative embodiment.
   - (G) Receive circuit alternative embodiment.
   - (H) Two-wire option.
   - (I) Differential-type reed relay.

1.—SYSTEM ORGANIZATION

Referring to FIGS. 1–8, the system consists of the line group 100, group selector 300, register-sender group 600, and the translator 700. There is also a trunk group 500 which provides access from incoming trunks to the registers, and a control center 800 which contains a special computer for operation analysis and recording, and a program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semiconductor circuitry is employed throughout the system. A ferrite core memory 660 is used for temporary storage whereas the magnetic drum 730 is used for semipermanent storage.

The space division switching elements of the system consists of reed relay matrix assemblies.

*Control center*

The control center 800 is designed for the purpose of introducing automation into the maintenance administration of the switch board. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written onto the magnetic drum.

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C, make up the outgoing switching stages. Four stages, E, D, B, and A, make up the incoming switching stages. The 1000 subscribers lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide bypaths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up of crosspoint reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A third locks the hold winding to the sleeve of "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cutoff controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

*Group selector matrix*

The intermediate switching functions of the system are performed by a group selector 300. Three stages of crosspoint switches are provided. The first switching stage 312, the A stage, contains 60 cards of 50 crosspoints, each arranged in a 5 x 10 matrix. This switching matrix is associated with the inlet circuit 310 line and cutoff reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability of 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multifrequency or dial pulse. In this case, the marker will send back instruction regarding digit changes or a command for the sender to change the type of pulsing. If no change is required, the marker can switch the call through to an alternate trunk without changing the sender's instructions.

Insertion junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Trunk group matrix*

The trunk group 500 provides access for incoming trunks from outside of the office or for special intra-office trunks such as operator or wire chief. A trunk group matrix is capable of connecting any one of 75 incoming trunks to any one of sixteen registers on a single output level basis. All trunks in the same group of 75 are either dial pulse (DP) or multifrequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from a trunk to a register and an additional path is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 5 matrix unit. Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*The register-sender*

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multifrequency, or code pulse manner.

Communication with the system translators, line group markers, trunk markers, and group selector markers is accomplished by high speed serial transfer of digital information using diphase.

*The translator*

The translators 700 of the system provide semi-permanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) *Directory number translations* (*DNT*).—The directory number of the called party is translated into switching instructions to enable the register-sender to direct the routing of the call to its destination. The switching instructions contain the equipment location of the called telephone line and the party ringing instructions.

(2) *Line number translation* (*LNT*).—The calling party's line identification is translated into the calling party's directory number. The line number translations provide automatic number identification (ANI) for all one and two party lines.

(3) *Code translations*.—The called area, office, or special service code is translated into switching instructions. The translation capabilities required of control switching point (CSP) in the direct distance dialing (DDD) network are provided.

(4) *Special feature*.—Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provided 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microseconds for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up of 40 tracks provide storage for 12,000 memory words. The memory words are addressed consecutively around the drum circumference with the first 4000 addresses located in segment one, the second 4000 addresses in segment two, and the third 4000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

2.—SENDER TRANSMITTER, RECEIVE CIRCUITS, AND REGISTER JUNCTOR

The senders are universal, in that they provide all modes of sending required by the system. For intra-office signaling a high-speed code sending technique is used, while for sending to an outlying office the senders provide for either dial pulse or multifrequency signaling, as required by that office. Sending modes may be changed while in the process of routing an individual call.

A "resend" feature is provided to improve the grade of service by allowing a second attempt to complete a call over a different route, if the route first chosen runs into link blockage. It is also used where faulty operation was caused by an intermittent failure (for example, spurious pulses due to noise "spikes" on the intra-office transmission lines).

When required, the calling as well as the called number can be outpulsed. The calling number may be sent in any of the three outpulsing modes (dial pulse, multifrequency, code pulse).

The sender is divided into the following functional parts: loop and switch train supervisory unit, diphase sending controller, and the multifrequency and dial pulse controller.

The loop and switch train supervisory unit employs reed relays and is intended primarily for isolation of the electronic equipment from the switch trains and outside plant facilities. The specific functions of this circuit are:

(1) Signaling between the sender and the register junctor (seizure, holding, release, reorder, and end-of-send signals).

(2) Trunk supervision.

(3) Sender alarm and traffic metering facilities.

The switching digits sent from the sender to the markers are supplied, two digits at a time, by the common control, on request of the sender. The markers return one of the following instructions, and the sender responds accordingly:

(1) *Clear.*—This instruction causes this circuit to return to the initial "receive" state, to await the "connect" information from the succeeding marker.

(2) *Reorder (trunk busy) line busy and line idle.*—These instructions result in 120 i.p.m. busy, 60 i.p.m. busy, and switch through, respectively. They indicate to the sender that its functions on this call are complete. The instructions are repeated by the sender to the register junctor, which in turn signals the sender to release from the call.

(3) *Incomplete.*—This instruction is sent by the line group marker, and indicates that additional digits are required by the marker to process the call. The circuit clears the transceiver, loads the succeeding two digits, sends the digits to the marker, returns to the receive state, and awaits further instructions from the marker.

(4) *Resend.*—This instruction allows a second attempt to establish the connection, over a different route to the called destination, if the first attempt fails because the links are blocked. The main purpose of this feature is to improve the grade of service.

(5) *Trunk identity.*—This information identifies a point in the switch train where the call may be monitored for answer and disconnect supervision. This number is stored in the register-sender group, and if the call required billing, the number is transferred, along with the calling and called numbers, to the ticketing equipment for call-progress monitoring and time recording.

(6) *Alternate route.*—Consists mainly of instructions for the addition or deletion of digits to or from the called number, as determined by the route chosen by the marker. The sender does not analyze these values—it simply recognizes the presence of each digit. After the digits have been recognized and stored by the common equipment, the transceiver goes back to the initial "receive" state.

A. *Call-thru diagram*

FIGS. 9, 10 and 11 when arranged as shown in FIG. 32 comprise a call-thru diagram which shows a typical connection from a local calling party to either a local called party or to an outgoing trunk. The diagram particularly shows the signaling paths between the switching group markers and the register-sender group.

FIG. 9 shows an originating connection through a line group. The calling path extends from a calling party 2401 through his line circuit 2410 and crosspoints 2412, 2414 and 2416 of the line group switching matrices A, B and C respectively to an originating junctor 2420. From the originating junctor the connection extends via line OJ1B to the group selector, and also via line OJ1C and crosspoint 2481 of the R matrix to the register-sender group. In the line group marker, only the send-receive circuit 280 is shown, with the connection from the LNI sender 230 via the R matrix to the register sender-group. In the originating junctor 2420 relay 24JB provides contacts for splitting the tip and ring conductors between the calling party and the group selector while there is a connection to the register-sender group for this call. Relay 24JA provides for holding the preceding switch train and supplying the busy indicating potential. Relay 24BT is provided to supply trunk busy tone to the calling party and to hold the connection until the calling party hangs up.

In FIG. 10 in the upper half there is shown typical paths through the group selector for either a local call or an outgoing call. The inlet circuit 2510 comprises a line relay 25L and a cutoff relay 25CO. The contacts of the line relay provide a connection into the marker, of which only the connection to the send receive circuit 480 is shown. A local call may be extended via crosspoints 2512, 2514 and 2516 of the A, B and C switching matrices; and an outgoing call may be extended via crosspoints 2513, 2515 and 2517 of other A, B and C matrices of the selector.

In FIG. 11 at the top there is shown a typical outgoing trunk circuit, the one shown being arranged for loop pulsing and reverse battery supervision. It includes a battery feed relay 25BF on the local side of the repeat coil, a supervisory relay 26S which is shunted by a diode for polarization on the outgoing side of the repeat coil, and a slow release hold relay 26H.

In the center of FIG. 26 there is shown a typical terminating connection through a line group marker. The connection extends through a terminating junctor 2630, and crosspoints 2632, 2634, 2614 and 2612 of switching matrices E, D, B and A; thence through a line circuit 2610 to a called party 2601. In the line group marker only the send-receive circuit 280' is shown and particularly the connections thereto used in a terminating call, with connections via contacts of relay TJS in the terminating junctor. Two of these conductors are used for connection to the line loop receiving the code pulse signals from the sender, and the other four supply party ringing information to the terminating junctor.

Figure 25:
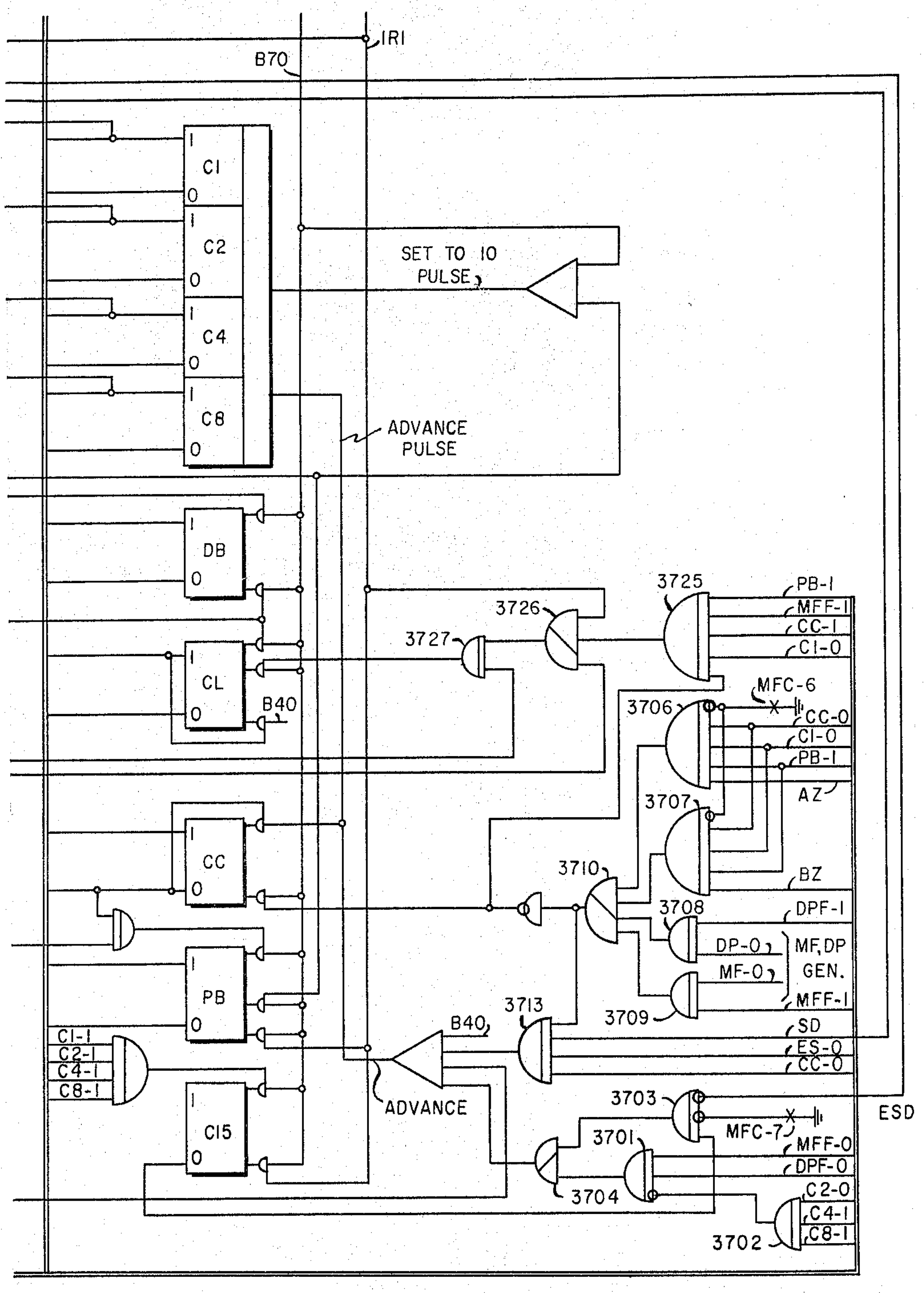

The lower parts of FIGS. 25 and 26 show a portion of the register-sender group. In FIG. 25 there is shown part of the register junctor 601, and the register receiver 630.

In FIG. 26 there is shown part of one of the sender transmitters. The connection to the sender transmitter extends from the register junctor 601 via a crosspoint of the RS matrix 681. The relay 27TR shows how normally the code pulse transceiver 3000 is connected to the line loop, and when this relay is operated the code pulse transceiver 3000 is disconnected, and the line loop is extended through contacts of the relay driver 2893 for dial pulse sending and through a repeat coil to an MF transmitter 2603. The dial pulse transmitter 2602 extends through a gate 3491 to drive the relay driver 2893. The showing of the dial pulse transmitter 2602 and multifrequency transmitter 2603 are merely symbolic here.

B. *Register junctor*

A local register junctor 601 is shown in FIGS. 12–14, arranged as shown in FIG. 33.

The register junctor portion of the register-sender comprises a maximum of 24 register junctors, local or incoming, in this preferred embodiment. An important function of the register junctor is the provision of a buffer between the electronic equipment of the register-sender group and the outside facilities. As such, the register junctor employs reed relays for all switching functions and performs all functions of the register-sender which require direct connection to the calling line. These functions include dial pulse repeating, dial tone control, battery feed to the calling line, calling station identification on party lines, test for coin deposit on calls from paystation, coin refund on busy or abandoned calls, and test for coin refund.

Upon seizure, the line marker connects low resistance ground over lead BY causing relay 45GO to operate and to connect ground via lead EC to the register receiver in the succeeding equipment. The register receiver then returns a ground signal over lead GO to hold relay 45GO, operated. Furthermore, this ground is extended through the winding of relay 45GO to lead BY which causes the line group marker to connect the diphase sender to the TR and RR leads. After all of the diphase information is received by the register receiver in the succeeding equipment, the register receiver removes ground from lead GO, thereby causing relay 45GO to restore.

The dial tone is provided for all calls immediately upon seizure. Relay 45H1 operates in response to ground being connected to lead H by the register receiver. As a consequence, relay 43DT operates and locks by means of its first winding. Relay 44H2 operates and connects relay 44A to leads TR and RR. Relay 45H1 also causes relay 45H4 to operate. These H relays hold the register junctor operated and provide a time delay before the release of the register junctor.

The dial tone is provided for all calls immediately upon seizure, being connected through winding 2 of relay 44A to the calling party under the control of relay 43DT. The tone is removed from the line upon the first on-hook signal from the line.

A call from a paystation causes relay 44CB to operate in response to ground being connected to lead CB by the succeeding common equipment. When calls originate from paystations which are not arranged to prevent dialing before coin deposit, dial tone is reconnected to the line if the calling party fails to deposit the coin. When calls originate from paystations which are arranged to prevent dialing before coin deposit, dial tone remains connected to the line until the coin is deposited. Deposit of the coin connects ground through the coin-control relay at the paystation via the preceding equipment to lead TR. When relay 44A restores on the first on-hook signal, the circuit is opened to relay 43PC and relay 43PB operates in series with relay 45PA, which connects sensitive polar relay 45PT to lead TR. If ground is connected to lead TR, relay 45PT operates. After approximately 20 ms., relay 44P2 operates, causing ground to be returned to the subsequent equipment over lead SB to indicate that the coin has been deposited. The operation of relay 44P2 also prepares relay 44A for the receipt of dial pulses.

The 20 ms. delay prevents registration of a momentary operation of the polar relay due to the discharge of ringers, or the discharge of line capacitance. The delay is accomplished by means of relay 43PC which produces a 20 ms. delay in restoration.

If the paystation subscriber had failed to deposit a coin, relay 45PT does not operate and relay 44P1 operates, instead of relay 44P2, after the 20 ms. delay, thereby causing relay 43DT to reoperate. Therefore, dial tone is reconnected to the line. On the next off-hook indication, relay 43PC reoperates and causes relay 44P1 to restore. This coin test operation is repated upon either the receipt of each on-hook signal until the coin is finally detected or the succeeding equipment causes the register junctor to release after a time-out period of approximately 35 seconds by removing ground from lead H1 to restore the hold relay 45H1.

The dial pulses are repeated by the register junctor to the common equipment as ground pulses over lead P under the control of relay 44A.

If the call originates from a party line, ground being connected through a three-thousand ohm resistor from the shunt springs of the dial, indicates that the call originates from party number 2 of that particular party line. Absence of ground indicates that the call originates from party number 1 of that particular line. Party identification is made in the same manner as the coin deposit test, with the exception that relay 44CB is not operated. Relay 44P2 indicates to the succeeding equipment which party has originated the call. After the sender has been coupled to the register junctor, three types of indications of the call progress may be sent from the sender to the register junctor; end of send, line busy, and reorder.

The end of send indication is transmitted upon the successful completion of the call. The junctor immediately returns a release signal to the sender and transmits a signal to the preceding equipment that the call has been successfully completed. This operation is accomplished upon the receipt of ground on lead ESV, causing relay 45ES to operate and to return ground over lead ESV for the release of the sender in the common equipment. Operation of relay 45ES also connects ground to lead ECR to signal the originating circuit. The junctor will continue holding the switch train for an additional 100 ms. to assure that the succeeding circuits have taken over control of the switch train.

The line busy indication is similarly performed with additional operations. To provide line busy indication −50 v. is received from the sender on lead BYV causing relay 44BY to operate. Thereupon relay 44LB operates and causes −50 v. to be repeated by lead BY to the preceding equipment. Relay 44BY is a special reed-type relay which has been disclosed in my copending U.S. patent application for a Control Circuit, Serial No. 204,-936, filed June 25, 1962. This special relay with break and make contacts is constructed with two differential windings to provide special operation. Relay 44BY operates via its upper winding, contact LB–6 and negative potential via lead BYV, which causes full operation of the relay. Relay 44BY can also operate by its lower winding when minus potential is applied to lead BYV, thereby causing relay 44BY to operate its make contacts only. A third condition may also exist wherein lead BYV is disconnected which causes a differential operation of relay BY to restore the relay to normal. Therefore, when a line busy condition occurs, a minus potential via a 100 ohm resistor in the sender, contacts LB–6, and the upper winding of relay 44BY to cause full operation of relay 44BY. Full operation of relay 44BY causes relay 44LB to operate via contact BY–4. Thereupon, the −50 v. is connected to lead BY via contacts BY–1 and LB–1 to repeat the line busy indication to the marker. It will be noted that a 300 ohm resistor from the negative potential and via contacts LB–5 to lead BYV to replace the resistance battery connected to lead BYV at the sender, because the sender places the resistance battery to lead BYV for a momentary interval only. It is also apparent that the other 300 ohm resistor which is connected directly to the lower winding of relay 44BY provides a reduced amount of current in the upper winding and increases the current in the lower winding to make the ampere-turns in the two windings equivalent, thereby providing differential windings by the proper selection of these resistors. In this preferred embodiment the upper winding of relay 44BY uses 5,000 turns with 800 ohms resistance and the lower winding uses 1,500 turns with 95 ohms resistance.

The reorder indication is provided from the sender during all calls which cannot be successfully completed, other than the actual line busy condition. Ground is received from the sender via lead BYV, causing relay 44BY to operate only its make contacts and to transmit ground, instead of −50 v., to the preceding equipment via line BY. Consequently the preceding equipment is able to distinguish the line busy indication from the reorder indication. As a result the register junctor signals the sender to release, repeats the reorder indication to the originating equipment, and then returns to idle.

During a reorder condition, ground is received via lead BYV causing relay 44BY to operate only its make contacts. Since this ground potential via lead BYV is present for a momentary interval only, ground is connected to lead BY via contacts H2–7, BY–7, and BY–8 to lock the circuit to the upper winding of relay 44BY via contacts LB–6. Relay 44LB does not operate during reorder due to the fact that ground via contacts BY–4 does not affect relay 44LB, because relay 44LB is short circuited via contact BY–5 which remains closed.

The reorder and the line busy conditions cause relay 44BY to remain operated until the register junctor is released, which causes relay 44H2 to restore and thereby cause relay 44BY to restore.

A trunk busy indication can be generated without the use of the sender, even before the sender is assigned to a particular register. Ground via contacts H2–7, either contacts CB–6 for coin box calls or contacts A–4 when the subscriber has delayed before dialing, contacts 26LB–7, in the absence of line busy, 27H1–5, and 27ES–6 which indicates that the end-of-receive condition is not true. Therefore the ground potential is applied to the upper winding of relay 44BY which causes relay 44BY to operate in the same manner as trunk busy being supplied by the sender.

If a call originates from a paystation, the sender is signaled to release, but the reorder indicated is withheld from the originating equipment until the coin has been refunded. Operation of relay 44BY causes relay 44TR to operate and, when relay 45H1 releases in response to the removal of ground from lead H1 by the succeeding equipment, relay 43CT operates via its number one winding. Relay 44CB also releases in response to the operation of relay 44TR. Operation of relay 43CT connects relay 43CF to the 120 IPM impulses, thereby causing relay 43CF to follow the 120 IPM to to cause relays 43CFA and 43CFB to operate and restore in a four state sequence.

During the first state, relay 43CFA is operated and relay 43CFB is restored. This condition allows −110 v. from lead CRB to be connected to lead TR, thereby enabling the coin-box to refund the coin.

During the next state relay 43CFB operates in series with relay 43CFA, maintaining the −110 v. on the line. The third state occurs when relay 43CF reoperates and relay 43CFA releases. If the coin has been successfully refunded, ground is removed from lead TR which causes the second winding of relay 43CT to be open circuited. At the same time the first winding of relay 43CT becomes short circuited, which allows relay 43CT to release.

However, if the coin had not been refunded due to the improper operation of the coin return mechanism in the paystation, ground on lead TR holds relay 43CT operated. Then relay 43CFB restores, which creates the last state in the sequence, and −110 v. is removed from the line in order to retransmit refund current on the next cycle. An impulse is needed for the operation of the coin return release mechanism rather than steady current flow. The four-state cycle is then repeated until the coin is successfully refunded.

If the coin is not refunded within approximately five seconds, relay 45H1 is reoperated opening the circuit to the second winding or relay 43CT and eventually restores relay 43CT to normal. If the coin is successfully refunded, relay 43CT restores which causes the remainder of the relays in the junctor to restore with the exception of relays 45H1 and 44BY. When relay 44TR restores, ground is transmitted via line BY to the preceding equipment. Thereupon, relays 45H1 and 44BY are eventually released by the succeeding equipment.

The trunk busy condition is also generated by the register junctor when the common equipment signals the register junctor to disconnect prior to the end of send indication from the sender. Relay 45H1 releases, thereby connecting ground to lead BYV. The remainder of the operation is performed as described above.

C. *Loop and switchtrain supervisory unit*

Figure 15:
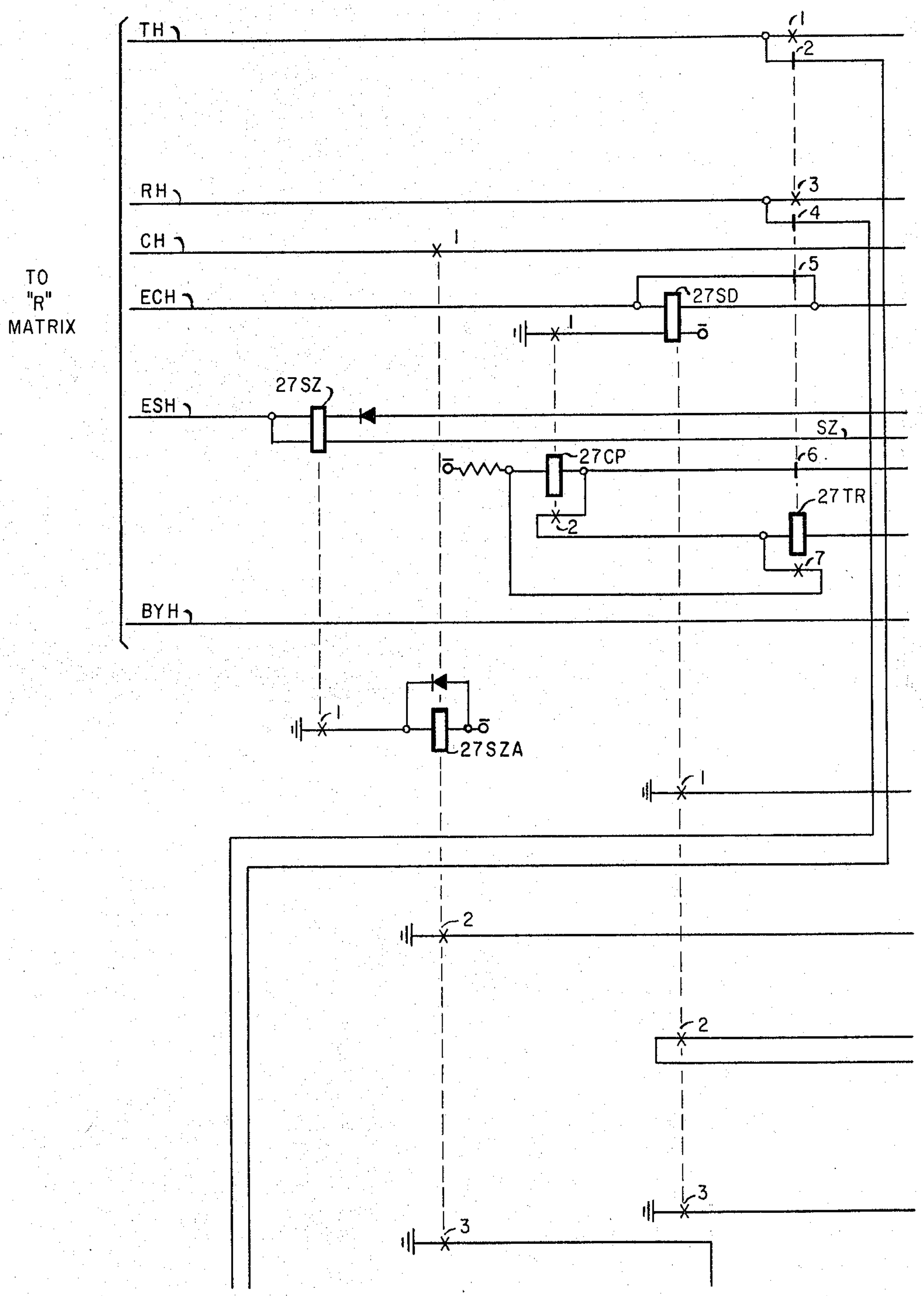
Figure 16:
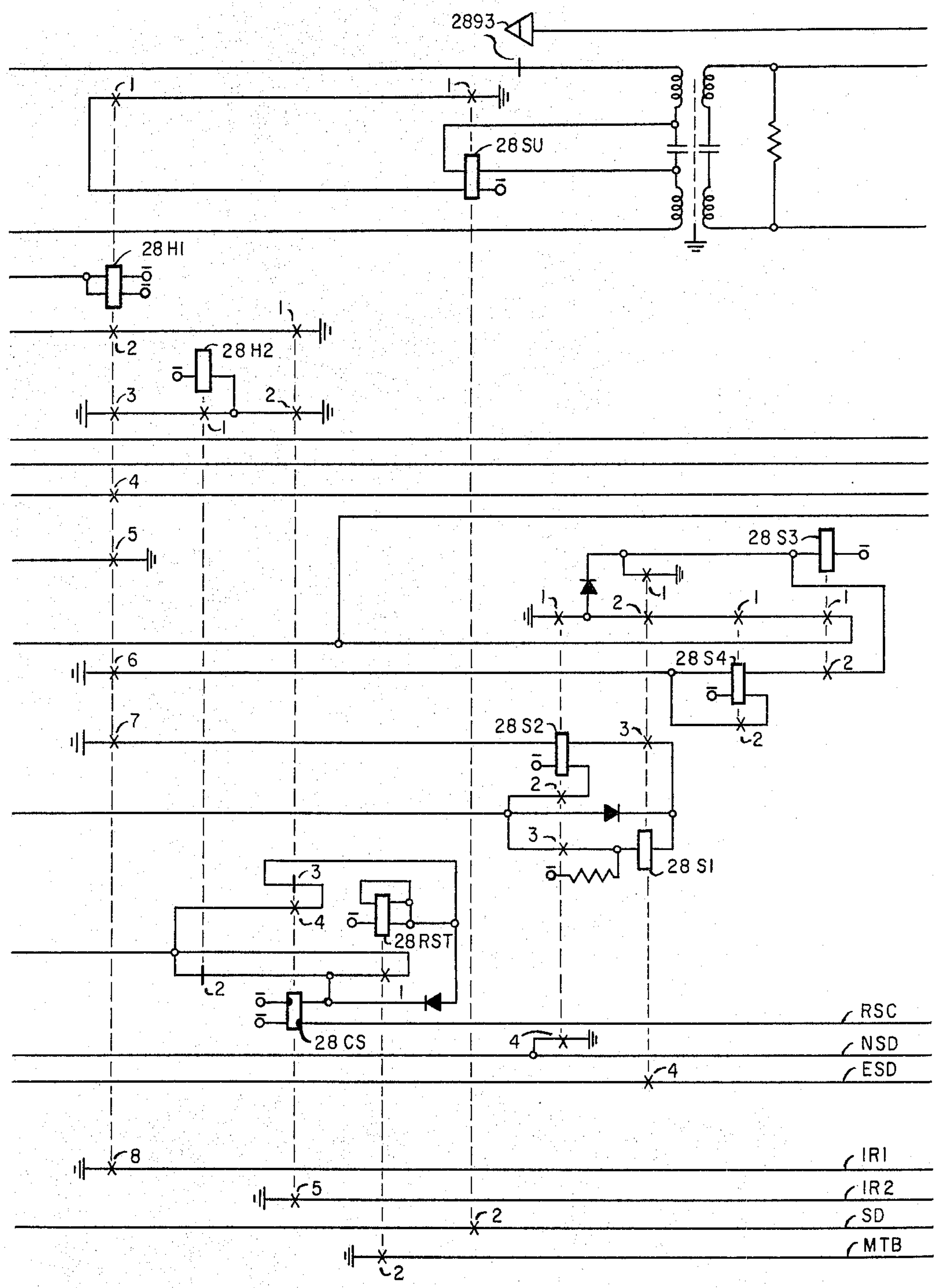
Figure 17:
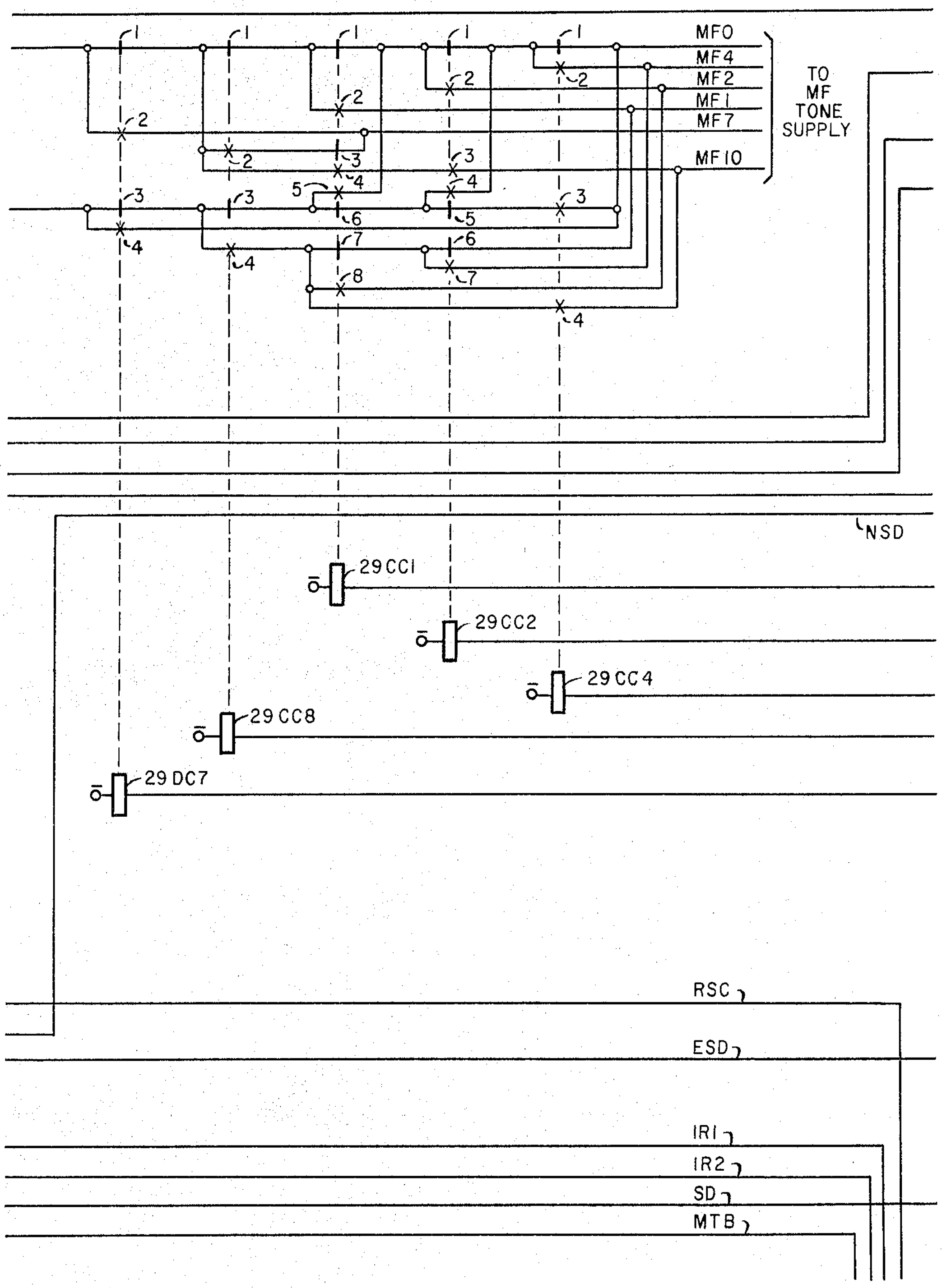
Figure 18:
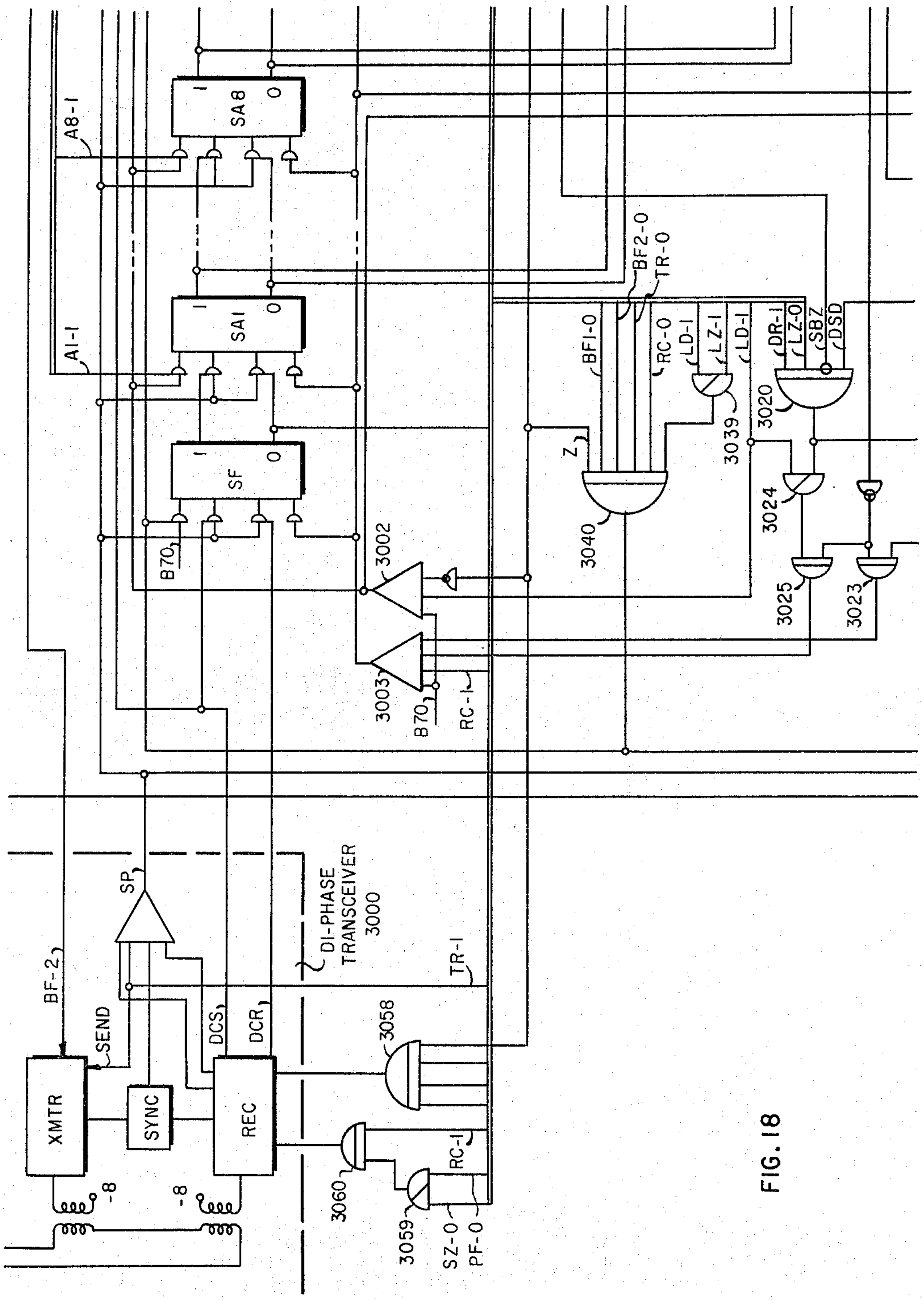
Figure 19:
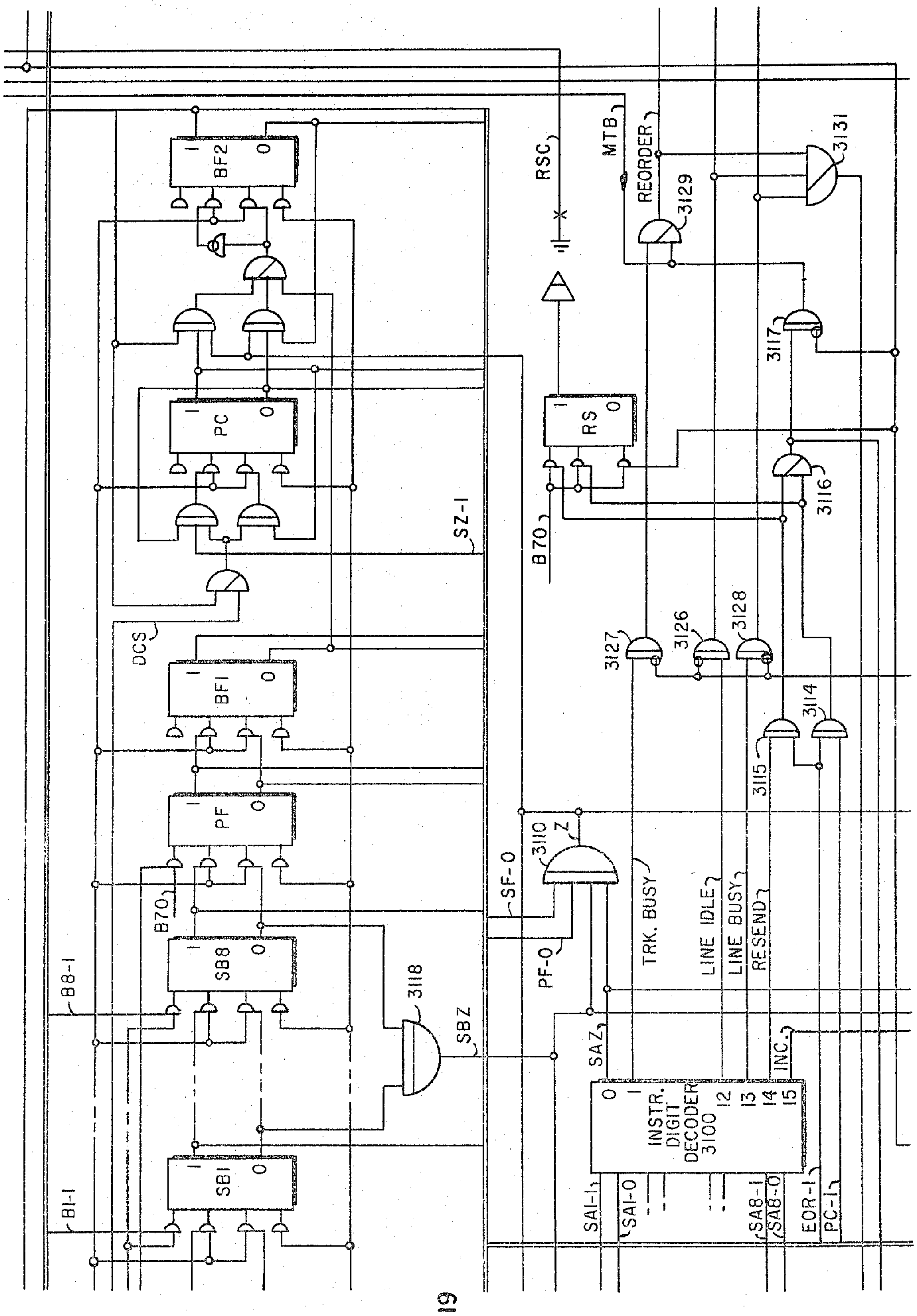
Figure 20:
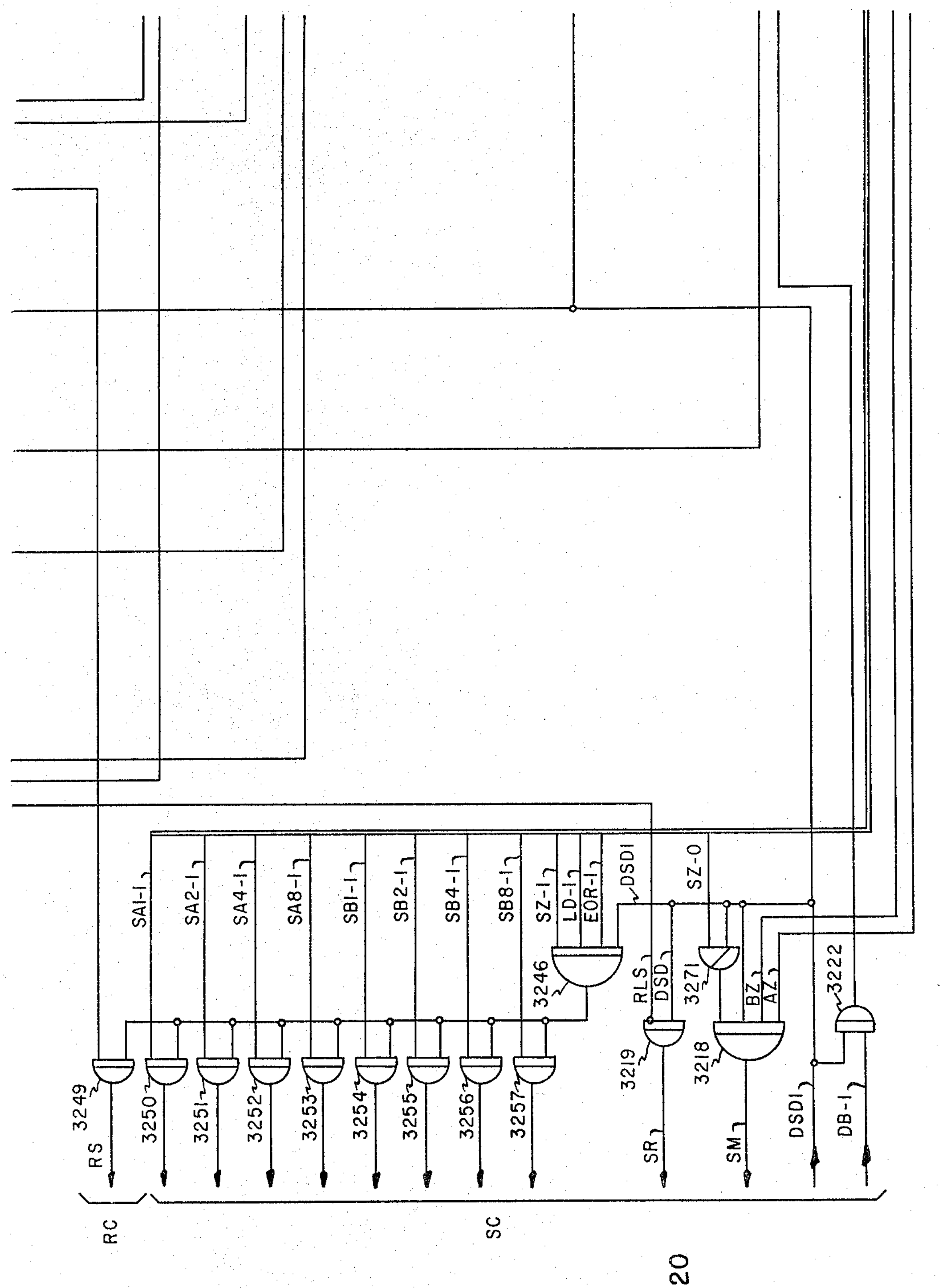
Figure 21:
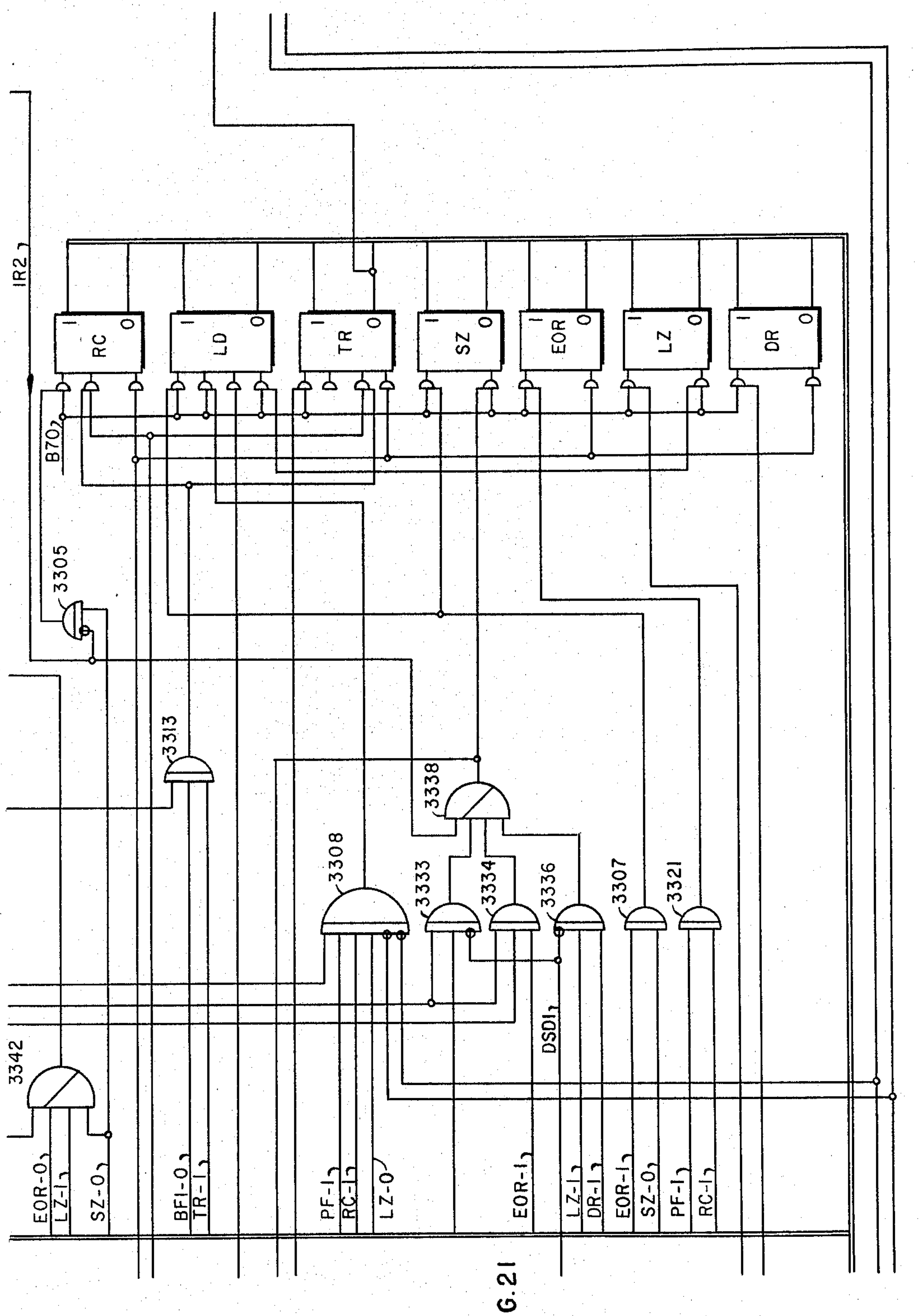
Figure 22:
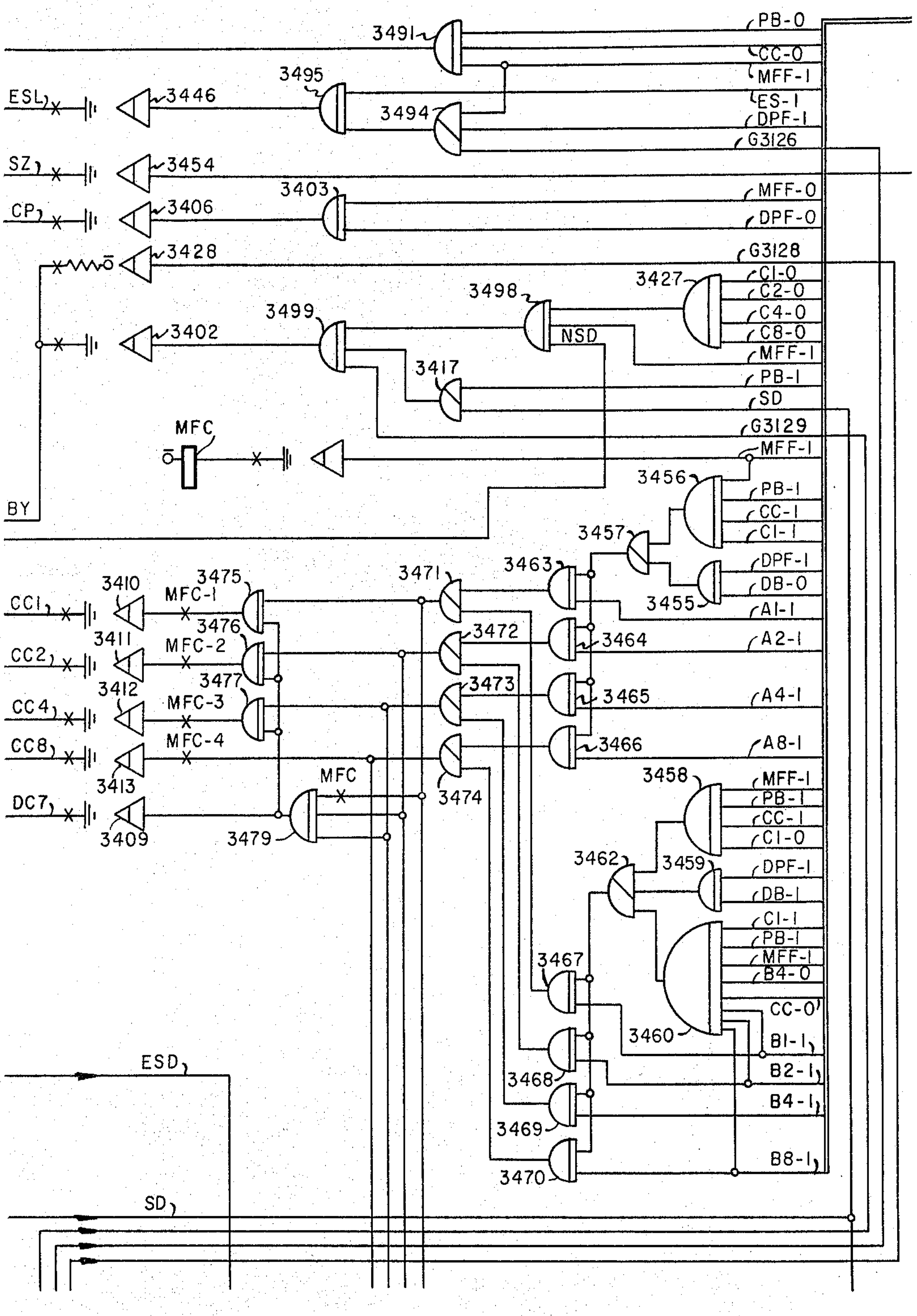
Figure 23:
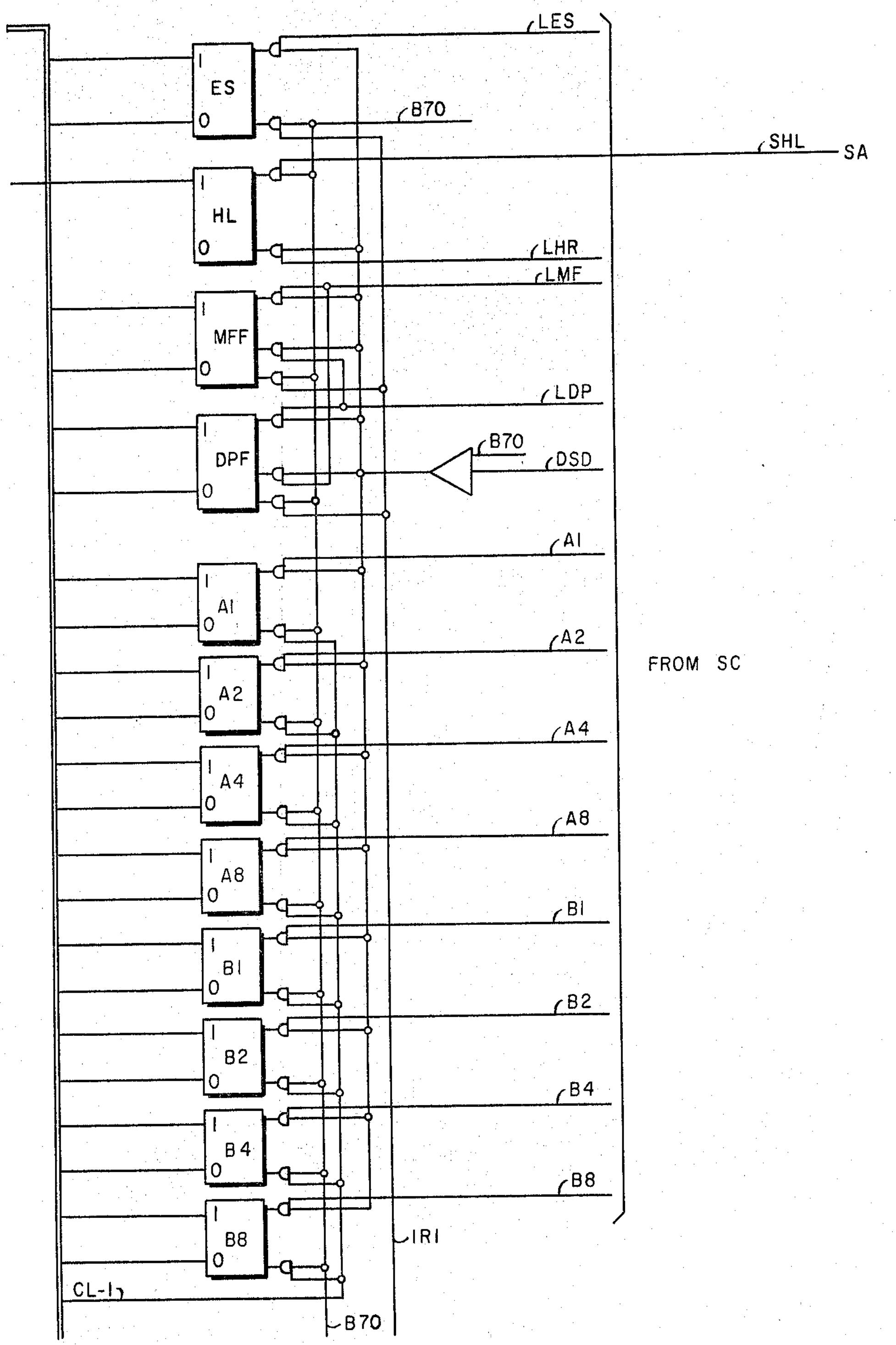
Figure 24:
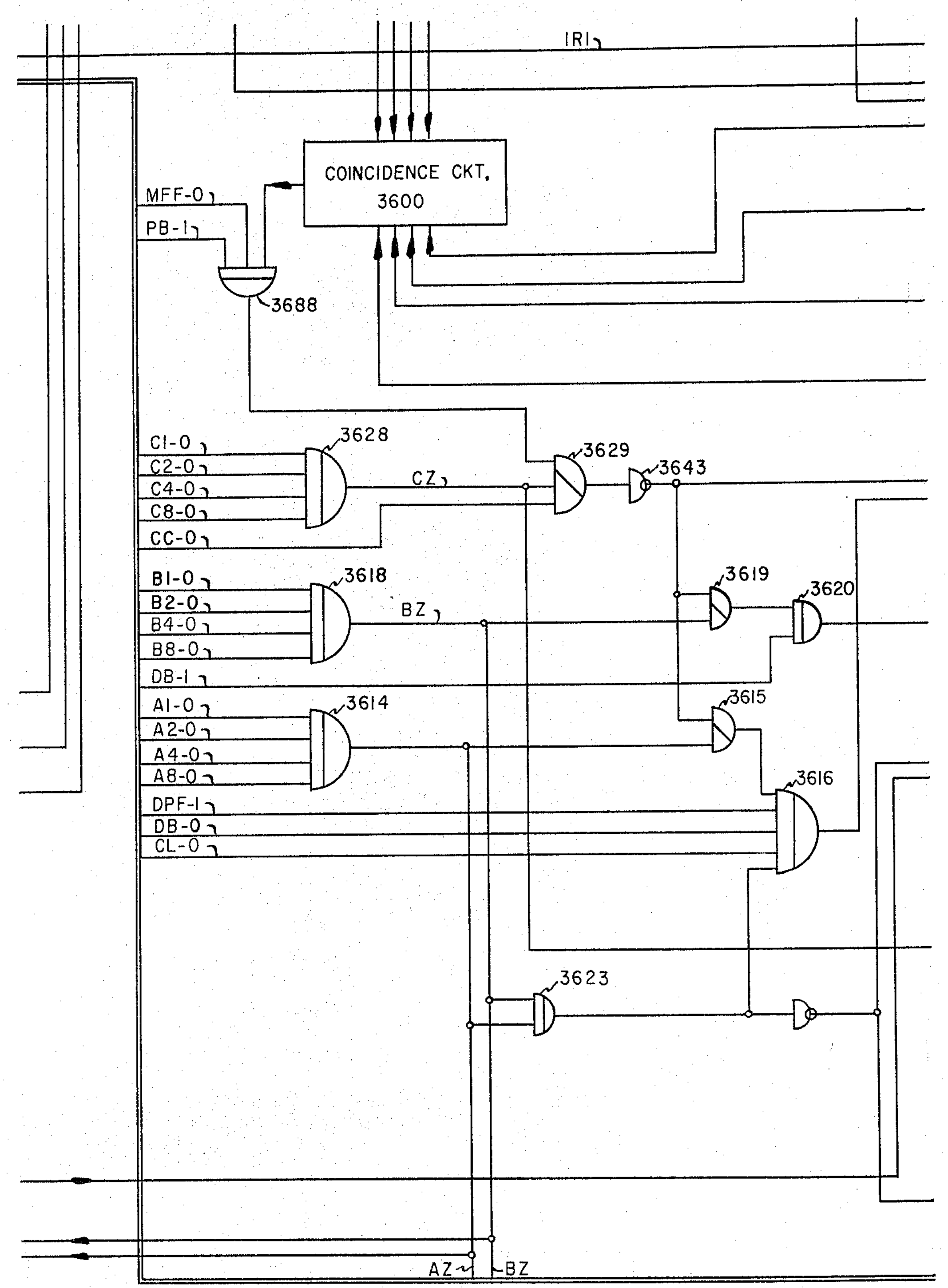

Referring now to FIGS. 15–17, relays 28H1–2 are the hold relays which provide holding potentials for the varous relays in this circuit. Relay 27SZ is the seizure relay which indicates that a connection has been established between the register junctor and the sendor. Relay 27SZA operates in connection with relay 27SZ during the seizure sequence and provides a certain amount of delay upon release of the circuit. Relay 27TR is the transfer relay which switches the line loop from diphase sending to the multifrequency and dial pulse mode of sending, and also provides locking ground for relay 27CP while the transfer is being completed. Relay 27CP is the code pulse (diphase) relay which indicates a code pulse call is in progress, and also locks relay 27SD as normally no stop-dial conditions occur during this type of a call. Relay 27SD indicates a stop dial condition, informing the sender to stop outpulsing. Relays 28S1–4 count the number of stop dials (three stop dials indicate a busy condition). Relay 28SU is the supervisory relay indicating that a path has been completed to an outgoing trunk.

Relay 28CS is the call signal relay which requests the service of the group selector marker and holds the switch train by extending a ground potential. Relay 28RST is the resend timer which causes relay CS to remove the holding ground from the switch train in the group selector marker, and to provide a 50 millisecond delay that assures a complete release of the switch train, and then to cause relay 28CS to reoperate thereby extending the holding ground for another switch train in the group selector marker. Differential reed relay 28CS is operated via its upper winding and ground via contacts 27SZ–2, thereby causing relay 28RST to operate via contacts 28CS–4. The operation of relay 28RST connects lead MTB to ground potential, thereby indicating a "resend" condition (absence of ground after the resend condition indicates a busy condition). During a resend condition ground on lead RSC in response to flip-flop 31RS and its associated relay driver opposes and releases relay 28CS via its lower winding to release the switch train by removing ground from lead ECH. Relay 28RST remains operated for approximately 50 milliseconds, then releases to open the upper winding of relay 28CS via contacts 28RST–1. Thereupon relay 28CS reoperates all of its contacts, thereby connecting ground potential to lead ECH to provide a holding potential for the new switch train in the group selector and preventing relay 28RST from reoperating by the operation of break contacts 28CS–3.

Relays 29CC1, 2, 4 and 8 and 29DC7 are for the purpose of decoding the binary additive code into the multifrequency signaling code (two out of six), connecting the tone leads to the line so that the two tone leads are always connected to the different sides of the line. Relay 29DC7 symbolizes the digital 7 code.

D. *Diphase sending controller*

Referring now to FIGS. 18–21, the diphase sending controller comprises a shift register, diphase transceiver 3000, control flip-flops, and other associated logic. Diphase transceiver 3000 communicates with the line group marker and the group selector marker in a high speed serial manner in connection with the shift register. The shift register comprises eight flip-flops SA1–8 and SB1–8 for two digits of four bits each, suffix bit flip-flop SF, and three prefix flip-flops PF and BF1–2.

The shift register is used to transmit two digits at a time to the markers. From the markers, instruction digits or alternate route instructions are received in the first digit position (flip-flops SA1–8). Ticketing digits may also be received in the second digit position (flip-flops SB1–8).

Flip-flop PC is used in connection with the shift register to determine whether an even number of true indications have been received by the shift register, thereby designating the receipt of valid information. The instruction digit SA1–8 is received from the markers and is decoded by instruction digit decoder 3100 to provide five indications as follows: trunk busy, line idle, line busy, resend, and incomplete. The instruction digit is also transferred to the sender controller by means of logic AND gates 3250–57. The sender controller has the capability of decoding the remaining ten indications regarding alternate route information as shown in the following table:

| Sender: | Alternate route Instruction to controller |
|---|---|
| 1 Trunk Busy | |
| 2 | |
| 3 | MF called number |
| 4 | DP called number |
| 5 | DP called number plus 2 digits |
| 6 | DP called number plus 3 |
| 7 | MF called number plus 3 |
| 8 | DP called number less 3 digits |
| 9 | MF called number less 3 |
| 10 | DP called number plus 5 |
| 11 | |
| 12 Line Idle | |
| 13 Line Busy | |
| 14 Resend | |
| 15 Incomplete | |

Flip-flop RC indicates that the shift register is in the receive state and enables the demodulator in diphase transceiver 3000. Flip-flop TR indicates that the shift register is in the transmit mode and enables the modulator in the diphase transceiver 3000. Flip-flop EOR indicates end of receive and provides synchronism with the diphase transceiver 3000. Flip-flop SZ indicates seizure of the diphase transceiver 3000. Flip-flop LZ indicates load zeros into the shift register for ticketing information. Flip-flop SZ and LZ are used in combination to indicate various conditions as follows: $\overline{SZ}$ $\overline{LZ}$ indicates connect; $\overline{SZ}$ $\overline{LZ}$ indicates the first setting of the shift register and; SZ LZ indicates the second setting of the shift register. Flip-flop DR indicates that digits have been recognized by the sender controller. Flip-flop RS indicates a resend condition as decoded by the instruction digit decoder 3100.

Logic gates 3105, 3113, 3108, 3133, 3138, 3134, 3136, 3107, and 3121 provide set and reset commands for various control flip-flops. Logic AND gate 3118 determines when each of the four ticketing digit flip-flops SB1–8 are reset in the shift register and generates signal SBZ in response thereto. Logic AND gate 3110 indicates that all of the flip-flops in the shift register are in the reset condition and generates logic signal Z in response thereto. Logic inhibit gates 3126–28 allow the trunk busy, line idle and line busy indications to be transferred to the multifrequency and dial pulse controller portion of the sender. These signals are inhibited by logic OR gate 3142 when flip-flops EOR and S2 are reset and flip-flop LZ is set. The output of OR gate 3129 is the "reorder" signal. The reorder command can be generated by the trunk busy indication and also by means of a second resend indication. Ground on lead MTB prevents the first resend signal from being transmitted through OR gate 3129. After the switch train has been released in response to a resend command, ground is removed from lead MTB, so that a second resend signal through OR gate 3129 generates the reorder signal. Gated pulse amplifier 3002 and its associated logic provide the send commands for the shift register and gated pulse amplifier 3003 and its associated logic provide the reset commands for the shift register. Logic AND gate 3219 provides the logic signal SR which indicates that this particular sender is connected to the sender controller. Logic AND gate 3218 generates command SM which indicates to the sender controller a request for more information to be received in the A and B flip-flops. Logic AND gate 3222 is used to set flip-flop DR to indicate that information has been successfully received by the sender controller as there are ten logic commands DSD individually associated with each sender and is multiplexed by the sender controller to identify each sender transmitter. Logic gate 3249 generates a signal in response to resend or parity check to the register via the register controller RC. Logic gates 3060 and 3058 control the receiver and the diphase transceiver 3000.

E. *Multifrequency and dial pulse controller*

Referring now to FIGS. 22–25, the multifrequency and dial pulse controller comprises the four A flip-flops and the four B flip-flops which provide a buffer storage area to receive switching digits from the sender controller at a two-at-a-time basis. These digits are then transferred to the shift register for diphase transmission, or they are used for multifrequency or dial pulse out-pulsing over the TH and RH leads in FIGS. 15. The four stage ring counter C is used in connection with both dial pulse and multifrequency sending. When the dial pulse mode is employed, counter C terminates the outpulsing when the value of the digit in either the A or B store is equal to the value of the count of counter C, thereby generating a coincidence signal from coincidence circuit 3600. Upon coincidence, the counter C is set to the count of ten in response to logic gates 3629 and 3643. Thereupon, counter C counts from 10 back to 0 which provides the interdigital pause. Counter C is advanced in the dial pulse mode in response to logic gates 3713, 3710, and 3708 which respond to the dial pulse generator. These gates simultaneously set flip-flop CC which generates a signal to enable gate 3491 to close the loop for outpulsing. The A digit is outpulsed first under the control of logic AND gate 3459 and the B digit is outpulsed alternately under the control of logic AND gate 3455.

During the multifrequency mode of sending, first the digits stored in the A flip-flops are gated to reed relay drivers 3409–13 under the control of logic AND gate 3456 to enable AND gates 3463–66 to provide the necessary tones for multifrequency (two-out-of-six code) signaling. Logic AND gate 3456 follows flip-flop CC which responds to logic gate 3709. Logic gate 3709 is directly connected to the multifrequency generator to provide the necessary timing intervals for multifrequency sending. During this mode of sending, only flip-flop C1 of counter C is utilized to select first the A store and then the B store for transmission. When the digit B is being outpulsed, logic AND gate 58 controls the operation. Logic AND gate 3460 generates the KP digit which is the digit 11 and is the first digit to be outpulsed.

If a stop dial condition occurs prior to count 15 of counter C during MF sending, at the end of the stop dial, the counter follows A.C. pulse train (18 kc.) under control of gate 3703 to count to 15. Thereupon flip-flop C15 is set to disable the fast operation of counter C, thereby providing no unnecessary delay in the resultant holding of the multifrequency equipment at the distant office.

Logic gate 3703 provides fast operation of the counter C during an end of send condition. During multifrequency operation counter C counts to 12 and then stops due to inhibit gate 3701 and AND gate 3702. The count from 12 to 0 provides a time delay (between 300–400 milliseconds) to allow the distant office to prepare to receive pulses and to return the stop dial indication, when required.

When a blank position in counter C is encountered, AND gate 3706 allows counter C to advance to the next count and logic AND gate 3707 allows the counter to advance for the even position being blank.

Flip-flop ES signifies the end of send condition. Flip-flop HL indicates the hold flip-flop upon seizure. Flip-flop MFF is the multifrequency flip-flop that represents the multifrequency mode of sending. Flip-flop DPF represents the dial pulse mode. Flip-flop DB is the gate-digit-B flip-flop which causes the digit B to be gated from the B store while in the set position and during DP sending allows the digit A to be gated from the A store during the reset condition. Flip-flop CL is the clear indication which resets the A and B store. Flip-flop CC, as mentioned before, is the counter control and provides the timing interval for outpulsing. Flip-flop PB is the pulse blocking flip-flop which when in its reset state prevents outpulsing to provide the interdigital pause while allowing the counter C to remain counting.

Reed relay driver 3496 connects ground potential to lead ESL when an end-of-send condition occurs in response to logic AND gate 3495 and logic OR gate 3494. Reed relay driver 3454 connects ground to lead SZ in response to flip-flop HL being set upon seizure. Reed relay driver 3702 connects ground to lead BY in response to logic gates 3499, 3417, 3798, and 3728 to indicate a trunk busy indication to the register junctor. Reed relay driver 3428 causes resistance battery to be connected to lead BY to indicate a line busy indication, thereby distinguishing line busy and trunk busy. Reed relay MFC is operated in response to a reed relay driver which operates when flip-flop MFF is set.

Logic AND gate 3688 enables the output of the coincidence circuit 3600 when flip-flop MFF is reset and flip-flop PB is set. Logic AND gate 3614 indicates that the A flip-flops are all reset and generate the command AZ. Logic AND gate 3618 indicates that the B flip-flops are all in the reset condition and generate the command BZ. Logic AND gate 3628 indicates that the counter C is reset (count 0) and generates the command CZ.

Logic AND gate 3620 and its associated logic gates set flip-flop CI and simultaneously reset flip-flop DB. Logic AND gate 3616 and its associated logic gates set flip-flop DB. The flip-flop CL may alternatively be set in response to logic gates 3727, 3726, and 3725 during the multifrequency mode of sending.

F. *Code pulse transceiver alternative embodiment*

The code pulse transmitter in FIGS. 26–27 can be the code pulse transceiver 3000, alternative to the diphase unit. Referring to the call-thru diagram in FIGS. 9–11, the receive circuit FIGS. 28–29 is the send-receive circuit 480 in the selector marker and the send-receive circuit 280' in the line group marker. Lead SC that connects the code pulse transmitter with the receive circuit is the stop control lead which is needed for the 3-wire option with this embodiment. This added connection is shown on the call-thru diagram by a dotted line which is connected from the send-receive circuit 480 and the send-receive circuit 280' to the code pulse transceiver 3000. This lead is not needed for the diphase or 2-wire option for this circuit. In the 2-wire option, the "stop" signal is transmitted from the receive circuit to the code pulse transmitter via lead T.

This embodiment of the code pulse signaling system uses a train of pulses to advance two counters in synchronism, one in the code pulse transmitter and the other in the receive circuit. The reference pulses are transmitted via lead T, and corresponding pulses are transmitted via lead R to convey binary-coded information. The receive circuit transmits a "stop" signal to the code pulse transmitter via the stop control lead SC to prevent the counters from advancing after the information has been transferred from the code pulse transmitter to the receiver, thereby providing revertive pulsing to transfer information from the markers to the register-sender group. The "stop" signal prevents the counters from advancing at a particular count selected by the receiver and thereby registers information with the counter in the code pulse transmitter.

Referring now to FIGS. 26–27, the code pulse transmitter using "X" connections for 3-wire operation includes the send counter 2715, decode logic 2710, flip-flop 26S, 26M, and 26E, astable multivibrator 26MVL, and other logic gates. The send counter 2715 is a binary counter comprising four flip-flops. The decode logic 2710 transforms the binary count into a one-out-of-sixteen code to gate the eight bits of information from storage positions A and B of the MF and DP controller via AND gates 2740–47, and also to designate certain instruction digits when the receiver stops the send counter 2715 at one of the preselected counts of the counter. Astable multivibrator 26MVI provides square wave pulses for both the code pulse transmitter and the receiver to advance the send counter 2715 and the receive counter in synchronism. The signal to advance the receive counter is transmitted via lead T from flip-flops 26S. Upon each step of the send counter 2715 a bit of information is transmitted from the A and B portions via OR gate 2739 and AND gate 2613 to lead R.

Multivibrator 26MVI and flip-flops 26S and 26M are arranged to advance the counters and, alternately, gate the binary information from the A and B storage positions to the storage area in a marker receive circuit via lead T under the control of AND gate 2613. When flip-flop 26S is set, both the send counter 2715 and the receive counter are advanced to the next step. When flip-flop 26S is reset, a bit of information stored in positions A and B is gated onto lead R which is selected by one of the eight AND gates 2740–47 corresponding to the step of the counter, and also gated pulse amplifier 27GPA2 is inhibited by flip-flop 26S.

Upon the setting of flip-flop 26S, flip-flop 27E becomes set when gated pulse amplifier 27GPA2 transmits the next clock pulse to advance the send counter 2715 and provide the necessary A.C. set command for flip-flop 27E. Whereupon, flip-flop 27E becomes set and thereby inhibits gated pulse amplifier 27GPA2 by means of AND gate 2731 to prevent any further clock pulses from being transmitted from gated pulse amplifier 27GPA2. When flip-flop 26S becomes reset flip-flop 27E becomes reset in response thereto. It will be noted that gated pulse amplifier 27GPA2 remains inhibited by means of AND gate 2731 as flip-flop 26S is now in the reset condition. Therefore, the cooperation between flip-flop 26S and flip-flop 27E provides that one and only one clock pulse be transmitted to the send counter 2715 when flip-flop 26S is in the set condition.

After two digits have been received and when the send counter and the receive counter enter state 9 (end of receive), a true indication is received on lead SC which is transmitted through OR gate 2628 to provide the "stop" signal, thereby inhibiting gates 2629 and 2630 to disable flip-flop 26S. Upon receipt of the "stop" signal the send counter 2715 and the receive counter are prevented from advancing states. After the marker processes the information received from positions A and B of the MF and DP controller, the "stop" signal via lead SC is removed which causes the counters to continue stepping. The receiver may then stop the counter at count 0 (clear), or one of the instruction digit counts (11–15), thereby indicating an instruction digit to the sender transmitter by the appropriate output of decode logic 2710. It is apparent at this point that the counter could be stopped at any count including counts 1–8, other than count 9, to designate information to the sender transmitter. It is also obvious that the entire information could be transmitted to the receiver before and end-of-receive condition was encountered, rather than sending two digits at a time.

When the send counter 2715 is in any one of counts 9–15, OR gate 2738 inhibits AND gate 2613, thereby preventing the transmission of information via lead R. Furthermore, OR gate 2738 generates a signal to cause relay driver 2701 to send signal SM to the sender controller requesting further information to be transferred to positions A and B of the DP and MF controller.

Relay driver 2606 causes the generation of the "stop" signal to inhibit the advancement of the counters at count zero if there are no digits present in positions A or B. Therefore, the counters are prevented from advancing until a digit is received in either A or B. When information is transferred from the sender controller to the DP and MF controller into the A or B positions, relay driver 2606 will restore, thereby removing the "stop" command and allowing sending to commence.

A "clear" command is generated from OR gate 2736 to set flip-flop CL in the DP and MF controller to thereby reset the flip-flops of the A and B storage area. The "clear" command is generated during count 9 of the send counter, which is the end-of-receive state. Furthermore, the "clear" command is generated during the idle condition by means of AND gate 2734, because the idle condition occurs when the counter is at count zero with the "hold" signal being true and the "stop" command being present. The "hold" signal is generated in the register junctor by means of relay H providing a ground signal when the sender circuit is busy and removing this ground condition (a true indication) during the idle state. The "stop" signal continues to be generated even after the receiver has disconnected due to the presence of a negative potential being applied via resistor 2680 to OR gate 2628. When the receiver circuit is connected to the code pulse transmitter, a ground signal is received via lead SC which overrides the negative potential via resistor 2680 to disable OR gate 2628, thereby removing the "stop" signal to indicate that the connection has been completed.

AND gate 2733 causes the counter to step to 0 during the idle condition of the code pulse transmitter, because during the idle condition the "hold" lead provides a true indication and the "stop" signal is present. Therefore, 27GPA2 causes the send counter 2715 to advance until count 0 is reached which thereby inhibits AND gate 2733 to prevent further advancement of the counter.

G. *Receive circuit alternative embodiment*

Referring now to FIGS. 28–29, the receive circuit using "X" connections for 3-wire operation comprises the receive counter 2815, decode logic 2810, flip-flops 29S and 29E, and other logic. The receive counter 2815, decode logic 2810, and the flip-flops serve the same functions as the corresponding units in the code pulse transmitter. Flip-flops 29S and 29E cooperate to advance the receive counter in response to the pulses received via lead T. The output of the receive counter 2815 is decoded by decode logic 2810 to gate the eight bits of information received via lead R from the code pulse transmitter to the storage area in the marker, and to gate instruction digits to the code pulse transmitter by generating the "stop" command which prevents the counters from advancing.

Upon seizure, ground is connected to AND gate 2943 by means of the marker to inhibit the output of AND gate 2943, thereby removing the inhibit from 29GPA2. The marker also connects a minus potential to AND gate 2944, thereby enabling the gate to operate relay 29ST. Relay 29ST operates and short circuits relay 29B, thereby causing relay 29B to restore which enables AND gate 2945. Since OR gate 2850 is not enabled, AND gate 2945 is inhibited (its output is at ground) which removes the "stop" signal from the code pulse transmitter by overriding the negative potential being applied to OR gate 2628 via resistor 2680.

Upon removal of the "stop" signal, the send counter 2715 and the receive counter 2815 are advanced. The receive counter 2815 is advanced via lead T, flip-flops 29E and 29S, and 29GPA2. Due to AND gates 2905 and 2906, the binary information received from the code pulse transmitter is transmitted via lead R alternately from the step signals being received via lead T. AND gates 2834–41 gate this information to the marker storage area during counts 1–8.

During count 9 the command to stop the counters is generated if an "end of receive" is received from the marker and no other instruction digit is present as shown by means of AND gate 2857. AND gates 2851–55 gate the instruction digits during counts 11–15. The "stop" signal is generated during count 0 if a "clear" condition is present. The "clear" condition stops both the send and receive counters at count zero, which is necessary for the group selector marker send-receive circuit.

H. *Two-wire option*

Referring now to FIGS. 26 and 29, using the "Y" connections, a two-wire signalling scheme is achieved. The "stop" signal is sent via inverter gate 2908, lead T, inverter gate 2611, and AND gate 2612.

Assuming that the receiver wishes to generate the "stop" signal, AND gate 2945 generates a true indication which causes inverter gate 2908 to have a false output (ground potential). As soon as flip-flop 26S is reset, the false condition is present at the input to inverter gates 2610 and 2613. Therefore the output of inverter gate 2610 is true (a minus potential). However, the ground potential connected to lead T from the output of inverter gate 2908 overrides the negative potential at the output of inverter gate 2610, thereby causing the input to inverter gate 2611 to be false. As a result, the input to inverter gate 2611 is false and the input to inverter gate 2613 is false which causes AND gate 2612 to be enabled. The output of AND gate 2612 is connected to OR gate 2628 to thereby generate the "stop" signal. Therefore, once the counters have been advanced to a certain count, the "stop" command can be generated immediately thereafter to maintain the send and the receive counters at the aforesaid count.

I. *Differential-type reed relay*

Referring now to FIG. 30, relays 44BY and 28CS are special reed-type relays which have been disclosed in my copending U.S. patent application for a Control Circuit, Serial No. 204,936, filed June 25, 1962.

This special reed relay with break and make contacts has two differential windings to provide special operation. In an ordinary reed relay break contacts are derived by placing a permanent magnet next to the reed switches which are to be normally closed. The normally open switches, make contacts, are located further from the permanent magnet and are not significantly effected by the magnet, thereby causing the switches to remain open. Upon operation of the ordinary reed relay, the magnetic field created by the coil opposes the flux of the permanent magnet to cause the break contacts to separate and also causes the make contacts to close.

The special reed relay used for relay 44BY and 28CS comprise windings 3001 and 3002 which are differentially wound, permanent magnet 3003, and a plurality of reed switches. The normally closed switch 3004 represents typical break contacts which are normally closed due to the fact that they are physically close to permanent magnet 3003. Normally open switch 3005 represents typical make contacts which are normally open due to the fact that they are located further from the permanent magnet.

This special reed relay operates by closing switch 3006 to energize coil 3001 in such a direction that the resulting magnetic field opposes the magnetic field of the permanent magnet 3003. As as result the magnetic field associated with winding 3001 causes break contact 3004 to open and causes make contact 3005 to close. Thus far, it will be noted that this operation is the same as in an ordinary reed relay. However, if switch 3007 is closed and switch 3006 is open, the magnetic field produced by coil 3002 is in the opposite direction relative to the direction of the magnetic field of coil 3001, thereby aiding the magnetic field of permanent magnet 3003. Therefore, the make contact 3005 will close, but the break contact will remain operated with an increased pressure.

Assume now that switch 3006 is closed with switch 3007 remaining closed, the magnetic field produced by coil 3001 opposes and cancels the magnetic field produced by coil 3002. This differential operation does not affect permanent magnet 3003, which is the normal condition of the relay. As a result there are 3003 separate conditions of this relay: full operation by energizing winding 3001, operation of the make contacts only by closing winding 3002, and differential operation of the relay by closing both windings 3001 and 3002.

While I have described above the principles of my invention in connection with specific apparatus, it is to be clearly understood that this description is made only by way of example and not as a limitation to the scope of my invention.

What is claimed is:

1. In a communication switching system including a plurality of switching stages for extending connections between calling and called lines:

a plurality of line groups including said calling and called lines, a plurality of register means, means for seizing one of said register means and transmitting the called party number thereto for registration therein, a plurality of sender units, marker means for establishing said connections, connector means for selectively and operatively connecting each of said seized register means independently and directly to one of said sender units, said sender units comprising means to transmit coded information signals indicative of the destination of the call to said marker means and to receive information signals indicative of further processing required which are returned to said sender units from said marker means, and also comprising control means for controlling the further processing of the call in accordance with the last-mentioned returned signals.

2. In a communication switching system, the combination as claimed in claim 1, wherein said marker means further includes line marker apparatus associated with said line groups;

and wherein one of said information signals indicative of further processing required is an idle-mark signal returned to said sender unit from said line marker means in response to said called party being in an idle condition.

3. In a communication switching system, the combination as claimed in claim 1, wherein one of said information signals indicative of further processing required as a line-busy signal returned to said sender unit from said line marker means in response to said called party being in a busy condition.

4. In a communication switching system, the combination as claimed in claim 1, wherein one of said information signals indicative of further processing required is an incomplete-mark signal returned to said sender unit from said line marker means in response to said line marker means ascertaining the necessity for further information signals indicative of the destination of the call.

5. In a communication switching system, the combination as claimed in claim 1, wherein one of said information signals indicative of further processing required is a stop-send signal returned to said sender unit from marker means in response to the completion of the transmission of information signals indicative of the destination of the call.

6. In a communication switching system, the combination as claimed in claim 1 further includes a plurality of outgoing trunk means, wherein said plurality of switching stages including a group of selector stages and wherein said marker means further includes selector marker means associated with said selector groups for providing connections to said outgoing trunk means;

and wherein one of said information signals indicative of further processing required is a recorder signal reutrned to said sender unit from said selector marker means in response to said outgoing trunk means being in a busy condition.

7. In a communication switching system, the combination as claimed in claim 1, wherein one of said information signals indicative of further processing required is a clear signal returned to said sender unit from said selector marker means in response to the selector marker means causing a connection to be established through the selector group.

8. In a communication switching system, the combination as claimed in claim 1, wherein said marker means further includes line marker apparatus associated with said line groups;

and wherein a first one of said information signals indicative of further processing required is an idle-mark signal returned to send sender unit from said line marker means in response to said called party being in an idle condition.

9. In a communication switching system, the combination as claimed in claim 8, wherein a second one of said information signals indicative of further processing required is a line-busy signal returned to said sender unit from said line marker means in response to said called party being in a busy condition.

10. In a communication switching system, the combination as claimed in claim 9, wherein a third one of said information signals indicative of further processing required is an incomplete-mark signal returned to said sender unit from said line marker means in response to said line marker means ascertaining the necessity for further inforation signals indicative of the destination of the call.

11. In a communication switching system, the combination as claimed in claim 1, wherein a first one of said information signals indicative of further processing required is a stop-send signal returned to said sender unit from said marker means in response to the completion of the transmission of information signals indicative of the destination of the call.

12. In a communication switching system, the combination as claimed in claim 11, further includes a plurality of outgoing trunk means, wherein said plurality of switching stages includes a group of selector stages and wherein said marker means further includes selector marker means associated with said selector groups for providing connections to said outgoing trunk means;

and wherein a second one of said information signals indicative of further processing required is a reorder signal returned to said sender unit from said selector marker means in response to said outgoing trunk means being in a busy condition.

13. In a communication switching system, the combination as claimed in claim 12, wherein a third one of said information signals indicative of further processing required is a clear signal returned to send sender unit from said selector marker means in response to the selector marker means causing a connection to be established through the selector group.

14. In a communication switching system as claimed in claim 1, wherein one of said information signals indicative of further processing required is a resend signal returned to said sender unit from said marker means in response to said marker means ascertaining the necessity to repeat the transmission of the information signals indicative of the destination of the call.

15. In a communication switching system, the combination as claimed in claim 14, wherein each of said sender units includes a first and a second relay for resend control, each relay having a plurality of encapsulated reed switches;

the first relaying having a permanent magnet and a first and a second winding so constructed and arranged that one of said switches has its contacts normally closed and other of the switches have their contacts normally opened, energization of the first winding causes the normally opened contacts to close while the normally closed contacts remain closed, energization of both windings in a differential opposing manner causes the contacts to restore to their said normal position and energization of the second winding only causes the normally opened contacts to close and the normally closed contacts to open;

said second relay having means making it slow to release;

a circuit path connecting the winding of the second relay to a normally closed switch and a normally open switch of the second relay in series, means responsive to seizure of said sender units to complete an operate path for the first winding of the first relay to cause it to operate its normally open contacts, and in response thereto to operate said second relay via said circuit path, energization of the first winding of the first relay being maintained via a switch of the second relay;

some of said switching stages being terminating stages for completing said connection to the called line, means for supplying a terminating call request signal to the terminating stages via closure of one of the normally open switches of the first relay;

means response to said resend signal to energize the second winding of the first relay to cause it to restore, thereby opening the path to the winding of the second relay and also opening the switch which supplies the terminating call request to release the terminating switch stages, said second relay restoring after a predetermined delay interval to thereby open the circuit of the first winding of the first relay, so that the first relay now has only its second winding energized and operates all of the contacts to said off normal position to supply the terminating call request signal to the terminating stages; the circuit path for the second winding now being open at the normally closed contacts of the first relay so that the second relay does not reoperate.

16. In a communication switching system, the combination as claimed in claim 15, further including reorder means for causing said reorder signal to be supplied to the calling line and the sender to be released; means for activating said reorder means responsive to said resend signal except when means effective with said second relay operated prevents the activation of the reorder means in response to the resend signal, whereby a first resend signal causes said operation of the first and second relays to release the terminating switching stages for the predetermined interval and then again initiates termination of the call, and a second resend signal instead causes the activation of said reorder means.

17. In a communication switching system, the combination as claimed in claim 16, wherein said sender units include means responsive to conditions within the sender units include means responsive to conditions within the sender units for alternatively generating said resend signal.

18. In a communication switching system, the combination as claimed in claim 1, further includes originating junctor means and wherein said control means includes connecting units for connecting said register means and sender units to the switching stages;

and wherein said connecting units include a busy control relay having a plurality of encapsulated reed switches, reorder signal means, release means and line busy means, the busy control relay having a permanent magnet and a first and a second winding so constructed and arranged that one of said switches has its contacts normally closed and other of the switches have their contacts normally opened, energization of the first winding causes the normally opened contacts to close while the normally closed contacts remain closed, energization of both windings in a differential opposing manner causes the contacts to restore to their said normal position, and energization of the second winding only causes the normally open contacts to close and the normally closed contacts to open;

said reorder signal means being responsive to a reorder signal to energize the first winding of said relay to cause the normally opened contacts to close while the normally closed contacts remain closed to thereby energize said release means operatively and directely associated with the sender unit and to thereby transmit a signal to said originating junctor means which transmits a busy indication to the calling party in response thereto, line busy means responsive to a line busy signal to energize the second winding of said relay causing only the normally open contacts to close and the normally closed contacts to open to thereby energize said release means and to generate a line busy indication.

19. In a communication switching system, the combination as claimed in claim 18, wherein said connecting units further includes means responsive to the calling party delaying the transmission of the called party number to energize the first winding of said busy control relay, thereby causing a signal to be transmitted to said originating junctor means which transmits the busy indication to the calling party.

20. In a communication switching system, the combination as claimed in claim 18, wherein said release means include an end of send relay in said connecting unit and a seizure relay having a first and a second winding in the sender units, a circuit path connecting the winding of the end of send relay to the first and second windings of the seizure relay, flip-flops means responsive to seizure of said sender units to complete an operate path via the first winding of said seizure relay, said end of send relay and said seizure relay so constructed and arranged that the seizure relay operates and the end of send relay does not operate, means responsive to the energization of said busy relay to cause said seizure relay to restore via said connection and the end of send relay to remain unoperated, thereby causing the sender unit to return to the idle condition;

and also means in said sender unit responsive to an end of send condition to close an operate path via said second winding of the seizure relay and said connection to the end of send relay, said end of send relay and said seizure relay so constructed and arranged that the end of send relay operates and the seizure relay restores, thereby causing both said sender unit and said connecting unit to return to the idle condition.

21. In a communication switching system, the combination as claimed in claim 1, wherein said transmit and receive means include a first cyclic counter with associated gating means and a source of recurring pulses, and said marker means includes a second cyclic counter with associated gating means, a first connection from said source to the second counter, said source of recurring pulses advancing the first counter and advancing the second counter in synchronism with the first counter via the first connection, a second connection from said gating means associated with the first counter to said gating means associated with the second counter, the gating means associated with said first counter for transmitting said coded information signals indicative of the desination of the call in coincidence with each step of counter in a sequential manner via said second connection to said gating means associated with the second counter, the second counter sequentially gating said coded information signals received via said first connection in coincidence with each step of the counter, thereby transferring said coded information signals indicative of the destination of the call from said sender units to said marker means.

22. In a communication switching system, the combination as claimed in claim 21, wherein said marker means further includes gating means for transmitting a stop signal to said source of recurring pulses to stop the operation thereof, thereby providing revertive signalling to said first counter to transfer information signals indicative of further processing required in coincidence with a given step of the second counter.

23. In a communication switching system including a plurality of switching stages for extending connections between calling and called lines, a plurality of groups of lines, each of said group serving a different class of subscriber stations, one of said groups connected to a plurality of paystations, each line of said group serving a single paystation, another group of said lines connected to a plurality of party line subscriber substations, each of said lines serving at least two subscribed substations.

a plurality of register means, means for seizing one of said register means and transmitting the called party number thereto for registration therein, a plurality of sender units, connector means for selectively and operatively connecting each of said seized register means independently and directly to one of said sender units, connecting units for connecting said register means and sender units to the switching stages, said connecting units including detection apparatus for recognizing the deposition of a coin by a paystation user in response to the deposition of a coin and a register receiving a first dialed impulse from a calling paystation and alternatively for identifying a calling subscriber's substation in response to a call being initiated from one of said party lines.

24. In a communication switching system including a plurality of switching stages for extending connections between calling and called lines, a plurality of classes of subscribers, one of said classes including paystations, a plurality of register means, a plurality of sender units, connector means for selectively and operatively associating each of said seized register means independently and directly to one of said sensor units, connecting units for connecting said register means and sender units to the switching stages, said connecting units including a plurality of relays for providing a plurality of cyclically recurring time intervals to extend a refund potential to said paystations upon a call not being completed during a first and a second time interval and including a detection relay operatively associated with said plurality of relays for detecting the refundment of coins deposited by the paystation user in response to said plurality of relays during a third said time interval and in response to the coins being refunded.

No references cited.

KATHLEEN H. CLAFFY, *Primary Examiner.*

WILLIAM C. COOPER, *Examiner.*